(12) United States Patent
Ishiguro et al.

(10) Patent No.: US 10,754,902 B2
(45) Date of Patent: Aug. 25, 2020

(54) INFORMATION PROCESSING SYSTEM AND INFORMATION PROCESSING DEVICE

(71) Applicant: CLARION CO., LTD., Saitama-shi, Saitama (JP)

(72) Inventors: Masao Ishiguro, Tokyo (JP); Akira Tanaka, Tokyo (JP); Kazushige Hiroi, Tokyo (JP)

(73) Assignee: CLARION CO., LTD., Saitama (JP)

( * ) Notice: Subject to any disclaimer, the term of this patent is extended or adjusted under 35 U.S.C. 154(b) by 238 days.

(21) Appl. No.: 15/544,655

(22) PCT Filed: Oct. 15, 2015

(86) PCT No.: PCT/JP2015/079203
§ 371 (c)(1),
(2) Date: Jul. 19, 2017

(87) PCT Pub. No.: WO2016/125342
PCT Pub. Date: Aug. 11, 2016

(65) Prior Publication Data
US 2018/0285462 A1     Oct. 4, 2018

(30) Foreign Application Priority Data
Feb. 5, 2015  (JP) ................. 2015-021162

(51) Int. Cl.
*G06F 16/9535*  (2019.01)
*G06F 16/22*    (2019.01)
(Continued)

(52) U.S. Cl.
CPC .......... *G06F 16/9535* (2019.01); *G06F 16/00* (2019.01); *G06F 16/22* (2019.01);
(Continued)

(58) Field of Classification Search
CPC .... G06F 16/00; G06F 16/22; G06F 16/24578; G06F 16/9535; G06Q 30/02; G06Q 30/0631; G06Q 30/063
See application file for complete search history.

(56) References Cited

U.S. PATENT DOCUMENTS 7,801,885 B1 *  9/2010  Verma ................. G06F 16/9535
                                                    707/713
2002/0038342 A1   3/2002  Ito
(Continued)

FOREIGN PATENT DOCUMENTS

EP   1193663 A2   4/2002
EP   2439653 A1   4/2012
(Continued)

OTHER PUBLICATIONS

Extended European Search Report dated Aug. 16, 2018 for the European Patent Application No. 15881159.6.
International Search Report for WO 2016/125342 A1, Dec. 8, 2015.

*Primary Examiner* — Irete F Ehichioya
*Assistant Examiner* — Xiaoqin Hu
(74) *Attorney, Agent, or Firm* — Volpe and Koenig, P.C.

(57) ABSTRACT

An information processing system includes a processing device communication with an information terminal. The system includes an input unit receiving user input, a display unit, a screen transition unit which decides a screen to be displayed and performs a screen transition based on the input of the input unit and the display unit, a screen transition score calculation unit which calculates a screen transition score for each screen transition, an item database which associates and stores an item name and attribute, an attribute score database which associates and stores the item attribute and an attribute score, an item search unit which searches the item database based on the user's input, and extracts the item attribute, and a score addition unit which adds the screen transition score calculated by the score calculation unit to the attribute score associated with the item attribute extracted by the item search unit.

4 Claims, 16 Drawing Sheets

(51) Int. Cl.
*G06F 16/2457* (2019.01)
*G06F 16/00* (2019.01)
*G06Q 30/06* (2012.01)
*G06Q 30/02* (2012.01)

(52) U.S. Cl.
CPC ....... *G06F 16/24578* (2019.01); *G06Q 30/02* (2013.01); *G06Q 30/0631* (2013.01)

(56) References Cited

U.S. PATENT DOCUMENTS

| | | | |
|---|---|---|---|
| 2003/0154263 A1 | 8/2003 | Hirai | |
| 2005/0240579 A1* | 10/2005 | Sasai | G06F 16/338 |
| 2008/0086306 A1* | 4/2008 | Hirota | H04M 3/4936 |
| | | | 704/251 |
| 2011/0029926 A1* | 2/2011 | Hao | G06F 16/38 |
| | | | 715/835 |
| 2011/0153598 A1* | 6/2011 | Kamimaeda | G06F 16/9535 |
| | | | 707/723 |
| 2015/0359039 A1* | 12/2015 | Haque | G06F 16/951 |
| | | | 702/188 |

FOREIGN PATENT DOCUMENTS

| | | |
|---|---|---|
| JP | 2002-108918 A | 4/2002 |
| JP | 2008-273497 A | 11/2008 |
| JP | 2011-048465 A | 3/2011 |
| JP | 2014-241498 A | 12/2014 |

\* cited by examiner

FIG.6

SCREEN TRANSITION DB 405

| TRANSITION SOURCE SCREEN ID | INPUT DATA CLASSIFICATION | TRANSITION DESTI-NATION SCREEN ID | SCREEN TRANSITION DESTINATION PROCESSING | SCREEN TRAN-SITION SCORE |
|---|---|---|---|---|
| 1 | SEARCH CONDITION/SEARCH INSTRUCTION | 2 | SEARCH | 10 |
| 1 | RECOMMENDATION DISPLAY INSTRUCTION | 10 | RECOMMEND | 0 |
| 2 | SEARCH CONDITION/SEARCH INSTRUCTION | 3 | SEARCH | 10 |
| 2 | CANCELLATION INSTRUCTION | 1 | CANCEL | 0 |
| 2 | RECOMMENDATION DISPLAY INSTRUCTION | 10 | RECOMMEND | 0 |
| 3 | DETAIL DISPLAY INSTRUCTION | 4 | DISPLAY DETAILS | 20 |
| 3 | ROUTE GUIDE INSTRUCTION | 5 | ENTER | 50 |
| 3 | CANCELLATION INSTRUCTION | 1 | CANCEL | 0 |
| 3 | RECOMMENDATION DISPLAY INSTRUCTION | 10 | RECOMMEND | 0 |
| 4 | ROUTE GUIDE INSTRUCTION | 5 | ENTER | 50 |
| 4 | CANCELLATION INSTRUCTION | 1 | CANCEL | 0 |
| 5 | RETURN | 1 | — | 0 |

FIG.7

ITEM DB 407

| ITEM ID | BIBLIOGRAPHIC ITEM ||| ATTRIBUTE ||||
| | ITEM NAME | (LATITUDE, LONGITUDE) | LOCATION | LARGE CATEGORY | MEDIUM CATEGORY | SMALL CATEGORY | ATMO-SPHERE |
|---|---|---|---|---|---|---|---|
| 1 | AAA | (a1, a2) | aa | EATING/DRINKING PLACE | RAMEN | HAKATA RAMEN | LIVELY |
| 2 | BBB | (b1, b2) | bb | EATING/DRINKING PLACE | RAMEN | YOKOHAMA RAMEN | QUITE |
| 3 | CCC | (c1, c2) | cc | EATING/DRINKING PLACE | RAMEN | YOKOHAMA RAMEN | LIVELY |
| 4 | DDD | (d1, d2) | dd | EATING/DRINKING PLACE | RAMEN | SAPPORO RAMEN | LIVELY |
| 5 | EEE | (e1, e2) | ee | EATING/DRINKING PLACE | RESTAURANT | ITALIAN | QUITE |
| 6 | FFF | (f1, f2) | ff | EATING/DRINKING PLACE | FAST FOOD | HAMBURGER | QUITE |
| ... | ... | ... | ... | ... | ... | ... | ... |

FIG.9

| | | ATTRIBUTE VALUE SCORE DB | | | |
|---|---|---|---|---|---|
| SEARCH TARGET ATTRIBUTE | SEARCH TARGET ATTRIBUTE VALUE | ATTRIBUTE VALUE SCORE | | | |
| | | UID1234 | UID5678 | ... | |
| LARGE CATEGORY | EATING/DRINKING PLACE | 70 | 100 | ... | |
| LARGE CATEGORY | AMUSEMENT | 210 | 50 | ... | |
| MEDIUM CATEGORY | RAMEN | 40 | 70 | ... | |
| MEDIUM CATEGORY | RESTAURANT | 180 | 20 | ... | |
| SMALL CATEGORY | HAKATA RAMEN | 5 | 30 | ... | |
| ... | ... | ... | ... | ... | |

| ATTRIBUTE VALUE SCORE DB ||||||
|---|---|---|---|---|---|
| SEARCH TARGET ATTRIBUTE | SEARCH TARGET ATTRIBUTE VALUE | ATTRIBUTE VALUE SCORE |||| 
| | | UID1234 || UID5678 || ... |
| | | POSITIVE | NEGATIVE | POSITIVE | NEGATIVE | ... |
| LARGE CATEGORY | EATING/DRINKING PLACE | 40 | 30 | 50 | 50 | ... |
| LARGE CATEGORY | AMUSEMENT | 10 | 200 | 40 | 10 | ... |
| MEDIUM CATEGORY | RAMEN | 30 | 10 | 30 | 40 | ... |
| MEDIUM CATEGORY | RESTAURANT | 80 | 100 | 20 | 0 | ... |
| SMALL CATEGORY | HAKATA RAMEN | 0 | 5 | 20 | 10 | ... |
| ... | ... | ... | ... | ... | ... | ... |

411

INFORMATION PROCESSING SYSTEM AND INFORMATION PROCESSING DEVICE

TECHNICAL FIELD

The present invention relates to an information processing system and an information processing device.

BACKGROUND ART

In recent years, the research and development of recommendation technologies for extracting an item which coincides with the user's preference from huge quantities of items and recommending the extracted item to the user are being actively conducted. For instance, digital TVs are equipped with a function of extracting the characteristics of programs viewed or recorded by a user, and recommending similar programs to be broadcast in the future to that user. In the foregoing case, values are given to attributes such as "category, "channel" and "time slot" in program units, values of the respective attributes of the viewed or recorded programs are vectorized as the user's preference information, and future programs to be recommended are also vectorized. Subsequently, the similarity ratio between the vectors of the respective attributes is calculated, and future programs with a high similarity ratio are recommended. When calculating the similarity ratio of the attribute vectors, the method of calculating the Euclid distance or the inner product is used. PTL 1 discloses an invention of analyzing the user's preference based on the user's actions with regard to contents and contents information, and thereby generating preference information.

CITATION LIST

Patent Literature

[PTL 1] Japanese Patent Application Publication No. 2002-108918

SUMMARY OF THE INVENTION

Problems to be Solved by the Invention

With the invention disclosed in PTL 1, because a score indicating the user's preference is added only in the screen transition in which the item is ultimately determined, if the process is terminated midway, it is not possible to generate the user's preference information.

Means to Solve the Problems

According to the 1st aspect of the present invention, An information processing system including an information processing device, and a terminal which communicates information with the information processing device at least in one direction based on an electromagnetic method, wherein the information processing system includes an input unit which receives an input of a user, a display unit which displays a screen, a screen transition processing unit which decides a screen to be subsequently displayed by the display unit and causes the display unit to perform a screen transition based on the input of the input unit and the display of the display unit, a screen transition score calculation unit which calculates a screen transition score each time the screen transition processing unit causes the display unit to perform a screen transition, an item database which associates and stores an item name and an item attribute, an attribute score database which associates and stores the item attribute and an attribute score indicating the user's preference with regard to the item attribute, an item search unit which searches the item database based on the user's input, and extracts at least the item attribute and a score addition unit which adds the screen transition score calculated by the screen transition score calculation unit to the attribute score associated with the item attribute extracted by the item search unit.

According to the 2nd aspect of the present invention, it is preferred that in the information processing system according to the 1st aspect, the attribute score stored in the attribute score database is configured from a positive attribute score and a negative attribute score, the screen transition score calculated by the screen transition score calculation unit is configured from a positive screen transition score and a negative screen transition score, and the score addition unit adds the positive screen transition score to the positive attribute score, and adds the negative screen transition score to the negative attribute score.

According to the 3rd aspect of the present invention, it is preferred that in the information processing system according to the 1st or 2nd aspect, further includes a speech/video information acquisition unit which acquires a speech or video information; and a user status analyzing unit which analyzes a user status based on the speech or video information, wherein the screen transition score calculation unit varies the score to be added based on the user status.

According to the 4th aspect of the present invention, it is preferred that in the information processing system according to the 1st or 2nd aspect, further includes a recommended item information generation unit which extracts an attribute from the attribute score database with the highest attribute score, and extracts the item name associated with the extracted attribute from the item database.

According to the 5th aspect of the present invention, it is preferred that in the information processing system according to the 4th aspect, the recommended item information generation unit includes, a positive recommended item information generation unit which extracts an attribute with the highest positive attribute score, and extracts the item name associated with the extracted attribute from the item database, and a negative recommended item information generation unit which extracts an attribute with the highest negative attribute score, and extracts the item name associated with the extracted attribute from the item database.

According to the 6th aspect of the present invention, it is preferred that in the information processing system according to the 5th aspect, further includes a positive/negative selection unit which selects whether to use the positive recommended item information generation unit or the negative recommended item information generation unit.

According to the 7th aspect of the present invention, it is preferred that in the information processing system according to the 1st or 2nd aspect, the terminal includes the input unit and the display unit, and the information processing device includes the screen transition processing unit, the screen transition score calculation unit, the item database, the attribute score database, the item search unit, and the score addition unit.

According to the 8th aspect of the present invention, it is preferred that in the information processing system according to the 1st or 2nd aspect, the display unit displays a plurality of screens including an initial screen, and each time the screen transition score calculation unit calculates the screen transition score, the score addition unit integrates the calculated screen transition score as a temporary score, and adds the temporary score to the attribute score when the screen transition processing unit decides to make a transition to the initial screen.

According to the 9th aspect of the present invention, an information processing device which communicates with a terminal includes an input unit which receives an input of a user, and a display unit which displays a screen, wherein the information processing device includes, a reception unit which receives a signal sent from the terminal, a screen transition processing unit which decides a screen to be subsequently displayed by the display unit and causes the display unit to perform a screen transition based on the signal received by the reception unit, a screen transition score calculation unit which calculates a screen transition score each time the screen transition processing unit causes the display unit to perform a screen transition, an item database which associates and stores an item name and an item attribute, an attribute score database which associates and stores the item attribute and an attribute score indicating the user's interest level with regard to the item attribute, an item search unit which searches the item database by using the signal received by the reception unit based on the user's input, and extracts at least the item attribute; and a score addition unit which adds the screen transition score calculated by the screen transition score calculation unit to the attribute score associated with the item attribute extracted by the item search unit.

According to the 10th aspect of the present invention, an information processing device, includes, an input unit which receives an input of a user, a display unit which displays a screen, a screen transition processing unit which decides a screen to be subsequently displayed by the display unit and causes the display unit to perform a screen transition based on the input of the input unit and the display of the display unit, a screen transition score calculation unit which calculates a screen transition score each time the screen transition processing unit causes the display unit to perform a screen transition, an item database which associates and stores an item name and an item attribute, an attribute score database which associates and stores the item attribute and an attribute score indicating the user's interest level with regard to the item attribute, an item search unit which searches the item database based on the user's input, and extracts at least the item attribute and a score addition unit which adds the screen transition score calculated by the screen transition score calculation unit to the attribute score associated with the item attribute extracted by the item search unit.

Advantageous Effects of the Invention

According to the present invention, because a score indicating the user's preference is added for each screen transition, the user's preference information can be generated even when the process is terminated midway without the item being ultimately determined.

BRIEF DESCRIPTION OF DRAWINGS

FIG. 6 is a diagram showing an example of a screen transition DB.
FIG. 7 is a diagram showing an example of an item DB.
FIG. 9 is a diagram showing an example of an attribute value score DB.
FIG. 13 is a diagram showing an example of an attribute value score DB in Modified Example 6.

DESCRIPTION OF EMBODIMENTS

Embodiments

An embodiment of an information processing system according to the present invention is now explained with reference to FIG. 1 to FIG. 11.

Figure 1:
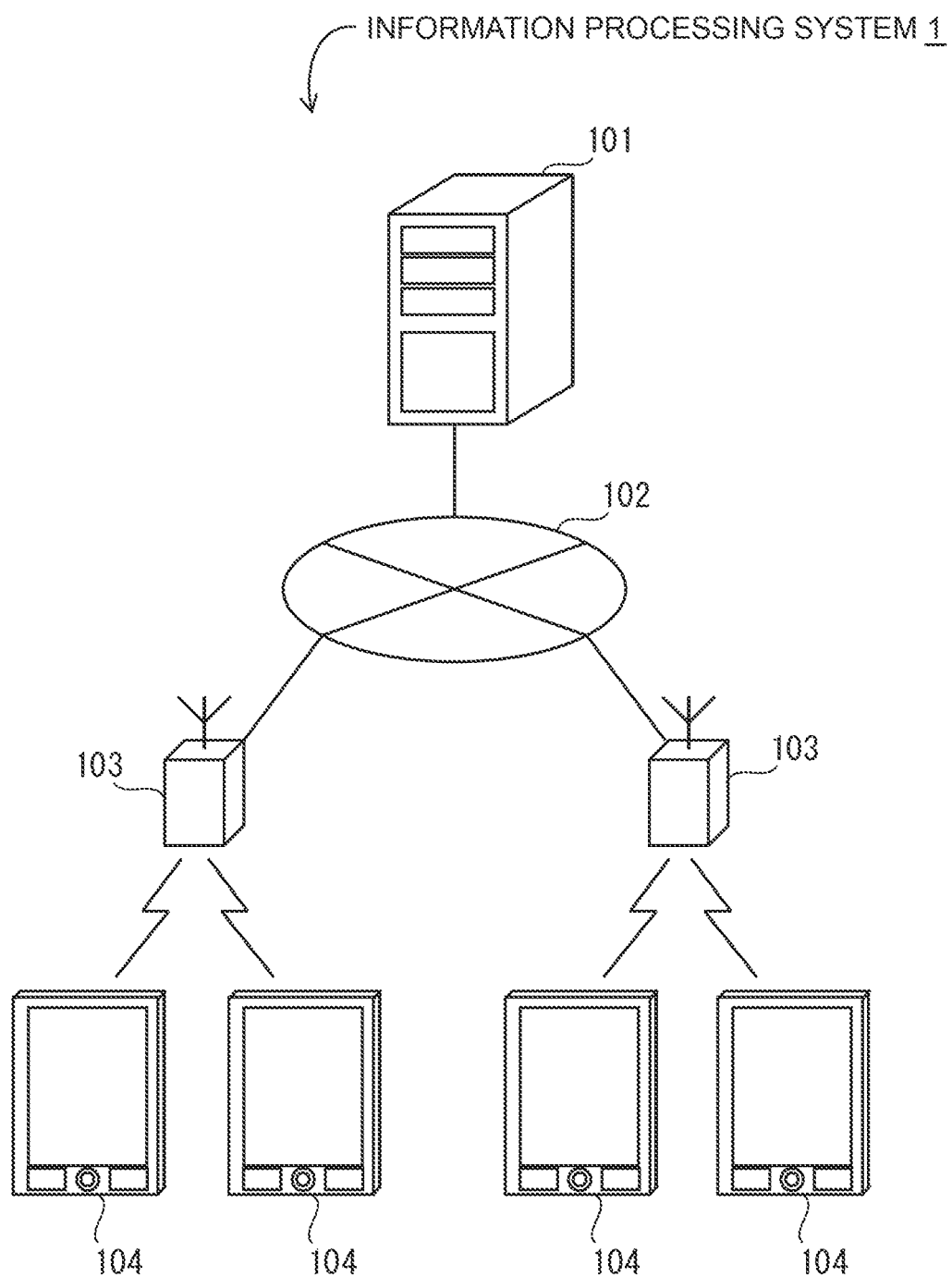
FIG. 1 is a schematic diagram showing the overall configuration of an information processing system.

FIG. 1 is a schematic diagram showing the overall configuration of the information processing system 1. The information processing system 1 is configured from an information processing device 101, and a plurality of portable terminals 104. The information processing device 101 is a publicly known computer system such as a server equipped with a network communication function, and processes a request from the portable terminal 104, and sends a response to the portable terminal 104.

The portable terminal 104 is a PDA (Personal Digital Assistance) equipped with a network communication function. As a result of the user operating the portable terminal 104, the portable terminal 104 becomes connected to the information processing device 101 via a base station 103 and a network 102. When the user is to receive one's intended service, the portable terminal 104 sends a request to the information processing device 101, and the portable terminal 104 sends information to the user in accordance with the response from the information processing device 101.

The network 102 is, for instance, an intranet or internet network such as a mobile phone network, a LAN (Local Area Network) or a WAN (Wide Area Network), and, in coordination with the base station 103, enables the sending and receiving of request data and response data between the information processing device 101 and the portable terminal 104.

The base station 103 is, for instance, a terminal device of a mobile phone network or an access point such as a wireless LAN, and, as described above, enables the sending and receiving of request data and response data between the information processing device 101 and the portable terminal 104 in coordination with the network 102.

In the system configuration of this embodiment, the portable terminal 104 specifically sends information regarding the user's actions and operations on the portable terminal 104 and setting information to the information processing device 101. The information processing device 101 selects an item to become a candidate to be presented to the user among huge quantities of items based on the received information, and sends information related to the selected item and the reason that the item was selected to the portable terminal 104. The portable terminal 104 displays, on the screen, the information related to the selected item and the reason that the item was selected which were sent from the information processing device 101.

An example of the hardware configuration of the information processing device 101 and the portable terminal 104 is now explained with reference to FIG. 2 and FIG. 3.

Figure 2:
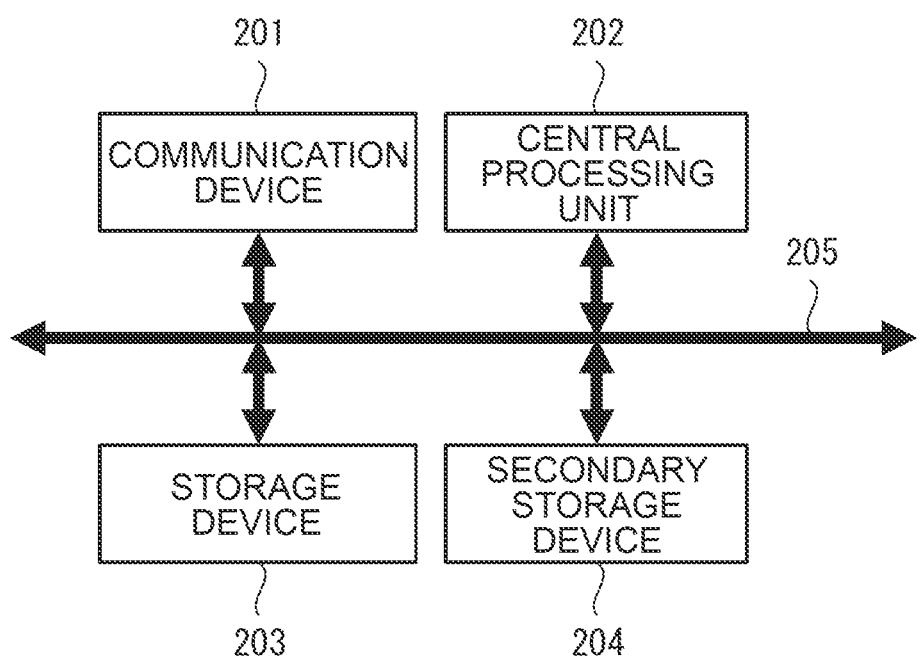
FIG. 2 is a diagram showing the hardware configuration of an information processing device.

FIG. 2 is a diagram showing the hardware configuration of the information processing device 101. The information processing device 101 includes a communication device 201, a central processing unit 202, a storage device 203, and a secondary storage device 204. The communication device 201, the central processing unit 202, the storage device 203, and the secondary storage device 204 are connected via a bus 205, and can mutually send and receive data.

The communication device 201 is, for instance, a network card unit such as a LAN card. The communication device 201 enables the information processing device 101 to be connected to the network 102.

The central processing unit 202 is mainly configured from a microprocessor, and executes programs stored in the storage device 203 and the secondary storage device 204, and controls the processing performed in the information processing device 101. The storage device 203 is, for instance, a random access memory (RAM). The storage device 203 stores data to be processed in the information processing device 101 such as programs to be executed by the central processing unit 202 and data received from the portable terminal 104.

The secondary storage device 204 is, for instance, a hard disk device or a non-volatile memory. The secondary storage device 204 stores a database containing information to be searched as described later, and various data and databases created by the information processing device 101.

Figure 3:
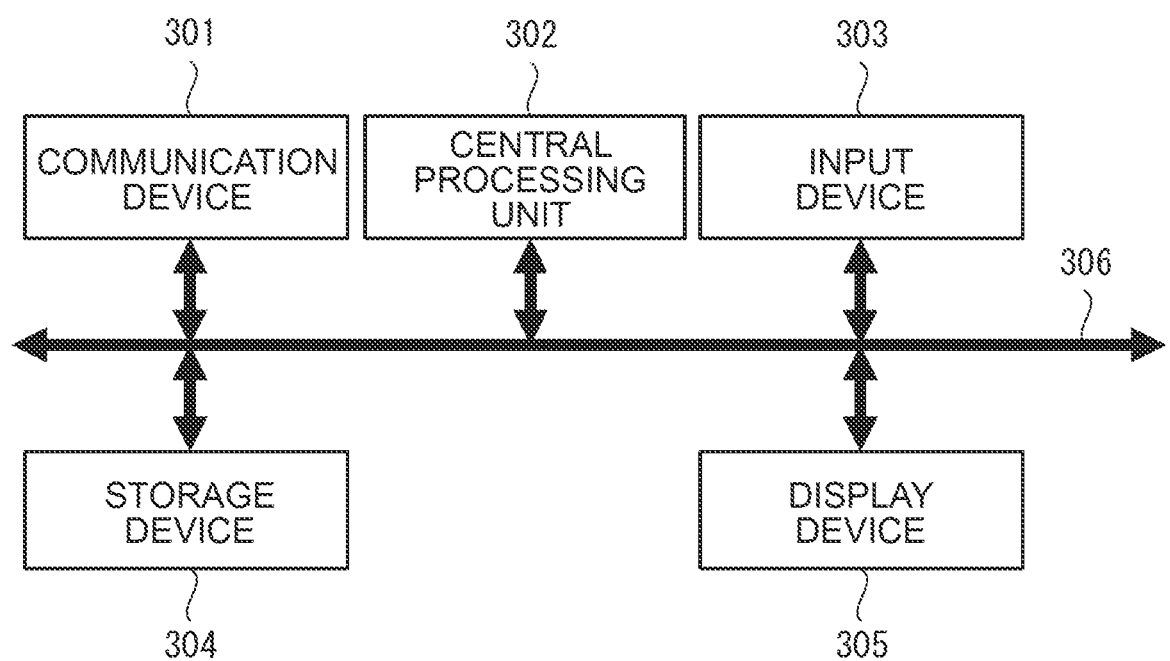
FIG. 3 is a diagram showing the hardware configuration of a portable terminal.

FIG. 3 is a diagram showing the hardware configuration of the portable terminal 104.

The portable terminal 104 is a publicly known device such as a PDA or a mobile phone equipped with a network communication function. The portable terminal 104 includes, as shown in FIG. 3, a communication device 301, a central processing unit 302, an input device 303, a storage device 304, and a display device 305. Note that the respective devices are connected via a bus 306, and can mutually send and receive data.

The communication device 301 is, for instance, a publicly known mobile phone network connection module and its driver in a mobile phone, or a wireless LAN connection module and its driver. The communication device 301 enables the portable terminal 104 to be connected to the network 102.

The central processing unit 302 is mainly configured from a microprocessor, and executes programs stored in the storage device 304, and controls the processing performed in the portable terminal 104.

The input device 303 is configured from a publicly known touch panel of a PDA, or a microphone which inputs speeches, and its driver. The input device 303 enables the user to perform input operations to the portable terminal 104. The user can use the input device 303 and input operations for performing a screen transition on the touch panel or selecting the contents from the search result, and additionally input the details of the request, such as the search condition, via the microphone.

The storage device 304 is, for instance, a random access memory (RAM). The storage device 304 stores data to be processed in the portable terminal 104 such as programs to be executed by the central processing unit 302 and data received from the information processing device 101.

The display device 305 is configured, for instance, from a liquid crystal panel of a PDA and its driver. The display device 305 displays the information in the portable terminal 104. As described later, the display device 305 displays the transition destination screen, and the search result or the recommendation result and the reason for recommendation received from the information processing device 101.

Functional Configuration of Information Processing Device

The functions of the information processing device 101 and the portable terminal 104 are now explained with reference to FIG. 4 and FIG. 5.

Figure 4:
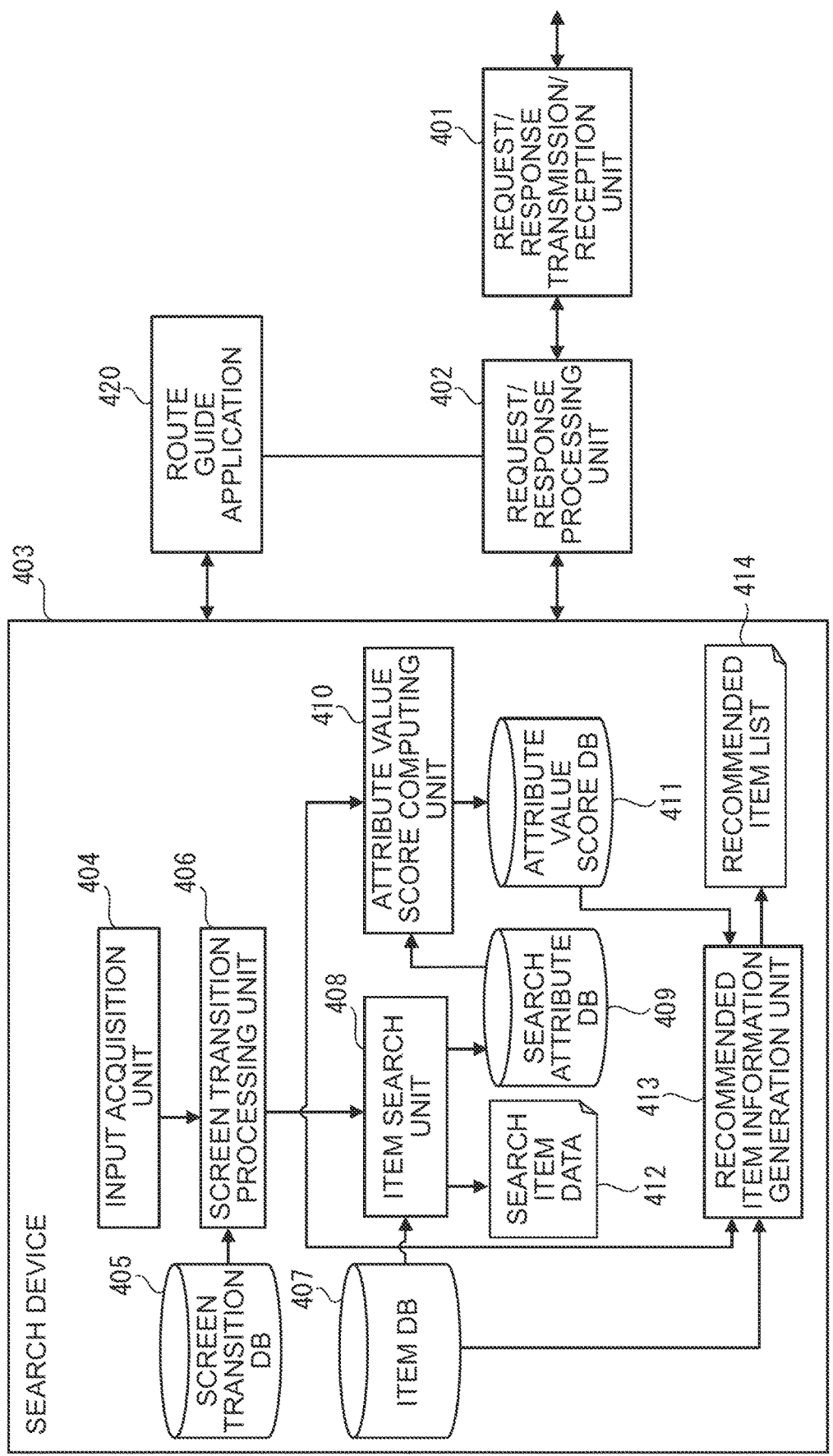
FIG. 4 is a functional block diagram of an information processing device.

FIG. 4 is a diagram showing, as functional blocks, the functions of the software programs executed by the central processing unit 202 of the information processing device 101. Note that, normally, there are an OS (Operating System) and control programs that activate the respective functional blocks and perform operation management in addition to these functional blocks, but in this embodiment, the coordinated operation of these functional blocks will be explained as appropriate, and the explanation and description of the OS and control programs are omitted because it is obvious that the OS and control programs activate the functional blocks and perform operation management which are required for the coordinated operation that is described in the ensuing explanation.

As shown in FIG. 4, the information processing device 101 includes, as functional blocks, a request/response transmission/reception unit 401, a request/response processing unit 402, a search device 403, and a route guide application 420. The search device 403 includes an input acquisition unit 404, a screen transition DB 405, a screen transition processing unit 406, an item DB 407, an item search unit 408, a search attribute DB 409, an attribute value score computing unit 410, an attribute value score DB 411, a search item data 412, a recommended item information generation unit 413, and a recommended item list 414.

The request/response transmission/reception unit 401 sends and receives request data from the portable terminal 104 and response data to the portable terminal through the communication device 201.

The request/response processing unit 402 processes data to be sent to and received from the request/response transmission/reception unit 401; that is, data to be sent to and received from the portable terminal 104. Specifically, the request/response processing unit 402 acquires, via the request/response transmission/reception unit 401, information that was input with the input device 303 of the portable terminal 104, a terminal ID for identifying the portable terminal 104, and a screen ID for identifying the screen that is currently being displayed, and notifies the acquired information and IDs to the input acquisition unit 404 in the search device 403. Moreover, the request/response processing unit 402 acquires information of the screen transition destination generated by the screen transition processing unit 406 in the search device 403, search item data generated by the item search unit 408, or recommended item data generated based on the attribute value score DB 411, and sends the acquired information and data to the portable terminal 104 via the request/response transmission/reception unit 401.

As described above, the input acquisition unit 404 acquires, via the request/response transmission/reception unit 401 and the request/response processing unit 402, information that was input with the input device 303 of the portable terminal 104, the user ID, and the current screen ID. The input acquisition unit 404 thereafter classifies the input information so that the information can be processed with the screen transition processing unit 406. The classified information is hereinafter referred to as the input data classification. As examples of the input data classification, there are, for instance, a search instruction of conducting a search based on the search condition of "ramen", a detail display instruction of displaying the details of shop "AAA", a route setting instruction of setting the route to shop "BBB", and a cancellation instruction of cancelling the shop search. The input acquisition unit 404 notifies the terminal ID, the current screen ID, and the generated input data classification to the screen transition processing unit 406.

The screen transition DB 405 is a database which stores information related to the screen transition that was determined in advance. As examples of information related to the screen transition, there are, for instance, a screen source ID, the input data classification described above, a transition destination screen ID, and processing in the screen transition destination.

The screen transition processing unit 406 refers to the screen transition DB 405, and acquires the screen ID of the transition destination and the processing in the screen transition destination by using the input data classification acquired from the input acquisition unit 404 and the current screen ID. For example, in a certain screen transition source, when the input data classification is a search instruction of conducting a search based on the search condition of "ramen", the screen transition processing unit 406 determines the screen transition destination that coincides with this condition, and, when the processing in the screen transition destination is "Search", sends a search instruction to the item search unit 408. When the processing in the screen transition destination is "enter" or "cancel", the screen transition processing unit 406 sends an attribute value score generation instruction to the attribute value score computing unit 410. Details regarding the generation of an attribute value score will be described later. When the processing in the screen transition destination is "recommendation", the screen transition processing unit 406 causes the recommended item information generation unit 413 to generate the recommended item list 414.

The item DB 407 is a database storing information related to a plurality of shops to be presented to the user. The item DB 407 is configured from a plurality of records, and information of one shop is stored in one record. Information related to a shop is configured from bibliographic items and attributes. Bibliographic items are, for instance, the shop's name, address, phone number, and shop hours. Attributes are, for instance, eating/drinking place, and ramen. Bibliographic items do not play any specific role in the processing described later. Attributes are given attribute values for each user to indicate the user's preference, and evaluated.

When a search instruction is sent by the screen transition processing unit 406, the item search unit 408 acquires a search condition from the screen transition processing unit 406, searches the item DB 407 and extracts a record that satisfies the search condition, and generates the search item data 412 as the search result. Moreover, the item search unit 408 stores, in the search attribute DB 409, the attributes of the items included in the search condition as the search attributes. The generated search item data 412 is sent from the portable terminal 104 to the portable terminal 104 upon receiving a request for acquiring the search item data 412 via the request/response transmission/reception unit 401 and the request/response processing unit 402.

The search attribute DB 409 is a database storing the search condition related to the attributes, and is configured from a plurality of records. Each record is configured from a search target attribute and a search target attribute value. The search attribute DB 409 is created based on the item search unit 408.

The attribute value score computing unit 410 is activated when an instruction for updating the attribute value score is sent from the screen transition processing unit 406. The attribute value score computing unit 410 updates the attribute value score of the corresponding user stored in the attribute value score DB 411 by using the search attribute DB 409 and the temporary score described later.

The attribute value score DB 411 is a database storing the attribute value score of each item attribute for each user. Specifically, the attribute value score DB 411 is configured from an attribute classification, an attribute value, and a user-based attribute value score, and the score is updated by the attribute value score computing unit 410.

The information processing device 101 performs the following operation upon receiving a recommended item data acquisition request from the portable terminal 104 having a certain user ID. Foremost, the information processing device 101 refers to the score of the user ID stored in the attribute value score DB 411, and extracts the attribute value with the largest attribute value score. Subsequently, the information processing device 101 searches for the record having the attribute value extracted from the item DB 407; that is, search for the information of the shop. The information processing device 101 thereafter sends, to the portable terminal 104, the extracted attribute value as the reason for recommendation and the search result as the recommended item data.

The search item data 412 is information related to the item satisfying the search condition which was extracted by the item search unit 408 from the item DB 407. The search item data 412 is sent to the portable terminal 104 via the request/response transmission/reception unit 401 and the request/response processing unit 402.

The recommended item information generation unit 413 is activated when a recommended item generation instruction is sent from the screen transition processing unit 406. The recommended item information generation unit 413 acquires information related to the target attribute from the screen transition processing unit 406, refers to the item DB 407 and the attribute value score DB 411, and generates the recommended item list 414 reflecting the user's preference. In other words, the recommended item information generation unit 413 extracts the attribute value with the highest attribute value score from the attribute value score DB 411, subsequently searches the item DB 407 for the record having this attribute value, and uses the search result as the recommended item list 414.

The recommended item list 414 is a list of shops to be recommended to the user which was extracted by the recommended item information generation unit 413 from the item DB 407.

The screen transition DB 405, the item DB 407, the search attribute DB 409, and the attribute value score DB 411 are created in the secondary storage device 204, and respectively configured such that they are temporarily stored in the storage device and used when necessary. The search item data 412 and the recommended item list 414 are created in the storage device 203.

The route guide application 420 is a known application comprising map information and a route search program. When information of the destination is output from the search device 403, the route guide application 420 calculates the route to the destination, and starts the routing assistance on the portable terminal 104 by using the request/response transmission/reception unit 401 and the request/response processing unit 402.

Functional Configuration of Portable Terminal

An example of the functional blocks of the portable terminal 104 is now explained.

Figure 5:
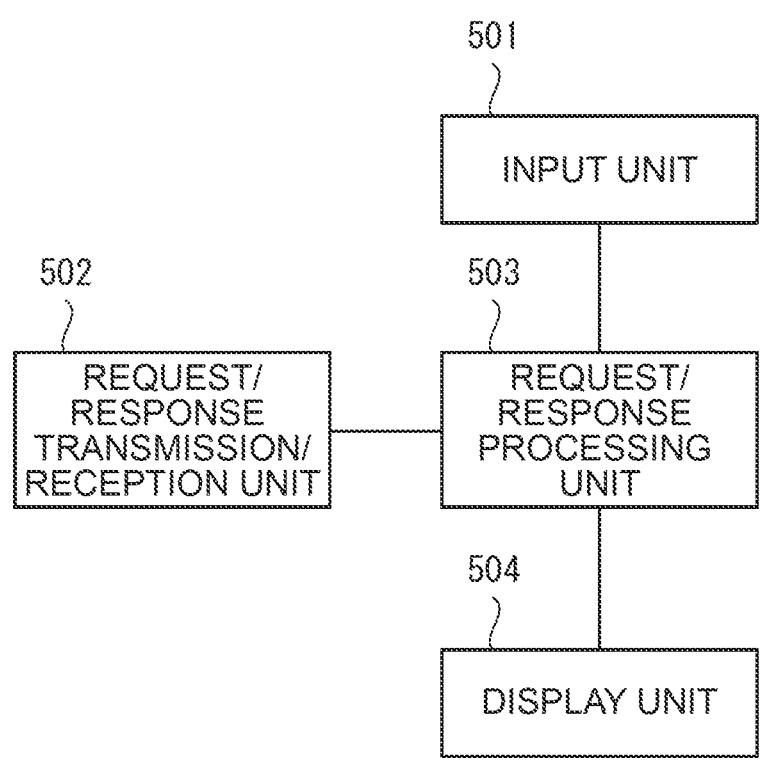
FIG. 5 is a functional block diagram of a portable terminal.

FIG. 5 is a diagram showing an example of the functional blocks of the portable terminal 104. Note that, while all of these functional blocks are explained as being software programs to be executed by the central processing unit 302, some or all of the functional blocks may also be realized as hardware. Moreover, normally, there are an OS (Operating System) and control programs that activate the respective functional blocks and perform operation management in addition to these functional blocks, but in this embodiment, the coordinated operation of these functional blocks will be explained as appropriate, and the explanation and description of the OS and control programs are omitted because it is obvious that the OS and control programs activate the functional blocks and perform operation management which are required for the coordinated operation that is described in the ensuing explanation.

As shown in FIG. 5, the portable terminal 104 includes an input unit 501, a request/response transmission/reception unit 502, a request/response processing unit 503, and a display unit 504.

Operations for screen transition, selection of shop, purchase of product, or viewing of contents are input by the user into the input unit 501. The user's operation history is acquired by acquiring information related to the user's operation of the input device 303 with regard to the information displayed on the display device 305 by the display unit 504 described later.

The request/response transmission/reception unit 502 sends the input information acquired by the input unit 501 to the information processing device 101 via the communication device 301. The request/response transmission/reception unit 502 receives information of the screen transition destination generated in the information processing device 101 via the communication device 301. The request/response transmission/reception unit 502 sends a request for acquiring the search item data and recommended item data to the information processing device 101 via the communication device 301. The request/response transmission/reception unit 502 receives information related to the search item data and recommended item data generated in the information processing device 101 via the communication device 301.

The request/response processing unit 503 generates an output screen based on the screen transition destination received by the request/response transmission/reception unit 502, and additionally generates an output screen based on the search item data and recommended item data by the request/response transmission/reception unit 502 and information related to the reason for recommendation.

The display unit 504 displays the output screen generated by the request/response processing unit 503 on the display device 305.

Data Structure

The data used in the information processing system 1; that is, the screen transition DB 405, the item DB 407, the search attribute DB 409, the attribute value score DB 411, and their data structure are now explained.

Screen Transition DB

The data and data structure of the screen transition DB 405 referred to by the screen transition processing unit 406 are now explained.

FIG. 6 is a diagram explaining an example of the data and data structure of the screen transition DB 405.

As shown in FIG. 6, the screen transition DB 405 is configured from a plurality of records. Each record is configured from a transition source screen ID, the transition destination screen ID, an input data classification, screen transition destination processing, and a screen transition score. The foregoing information is set in advance. Both the transition source screen ID and the transition destination screen ID store an identifier for uniquely identifying the screen. Each of these identifiers is an ID that is unique to each screen. When a predetermined input data classification is input while a screen indicated by the identifier of the transition source screen ID is being displayed, the screen switches (makes a transition) to a screen indicated by the identifier of the transition destination screen ID.

The input data classification includes the conditions of the input data classification for making a screen transition from the transition source screen ID to the transition destination screen ID. In other words, the input data classification includes, for instance, "search condition and search instruction", "detailed data display instruction" "route setting instruction", and "cancellation instruction". Each of these instructions corresponds to a search instruction of conducting a search based on the search condition of "ramen", a detail display instruction of displaying the details of shop "AAA", a route setting instruction of setting the route to shop "BBB", and a cancellation instruction of cancelling the shop search.

For instance, in the example shown in FIG. 6, when the transition source screen ID is "2", there is a possibility that the screen ID will make a transition to "3" or "1" or "10". When the input data classification is "detailed data display instruction", the transition destination screen ID will be "3", when the input data classification is "cancellation instruction", the transition destination screen ID will be "1", and when the input data classification is "recommendation display instruction", the transition destination screen ID will be "10".

The screen transition destination processing stores information representing the contents of the processing to be performed in the screen transition destination when a screen transition is made from the transition source screen ID to the transition destination screen ID, and, for instance, is "Search", "enter" or "cancel".

The screen transition score is the score to be added to the temporary score described later when a screen transition is made from the transition source screen ID to the transition destination screen ID.

Item DB

The data and data structure of the item DB 407 referred to by the item search unit 408 are now explained.

FIG. 7 is a diagram explaining an example of the data and data structure of the item DB 407 storing information related to shops that are subject to item search or item recommendation.

As shown in FIG. 7, the item DB 407 is configured from a plurality of records, and each record is configured from bibliographic items and attributes. Bibliographic items are configured from an item ID, an item name, latitude/longitude, and location. The foregoing information is defined in advance.

The item ID is an identifier for uniquely identifying the item, and is an ID that is unique to each item.

The item name is the item that is identified with the item ID; that is, the name of the shop.

The latitude/longitude represents the location of the item of the same record; that is, the location of the shop, in the form of latitude and longitude.

The location is the location of the item of the same record; that is, the location of the shop.

Attributes are configured from a large category, a medium category, a small category, and atmosphere. The large category is the value of the item attribute "large category" related to the item identified by the item ID. The medium category is the value of the item attribute "medium category" related to the item identified by the item ID. The small category is the value of the item attribute "small category" related to the item identified by the item ID. Atmosphere is the value of the item attribute "atmosphere" related to the item identified by the item ID. The value of the item attribute may be a numerical value or a character string.

In the example shown in FIG. 7, the item having the item ID of 1 has the attribute values of "eating/drinking place", "ramen", "Hakata ramen", and "lively". The item having the item ID of 2 has the attribute values of "eating/drinking place", "ramen", "Yokohama ramen", and "quiet".

Search Attribute DB

The data and data structure of the search attribute DB 409 generated by the item search unit 408 are now explained.

Figure 8:
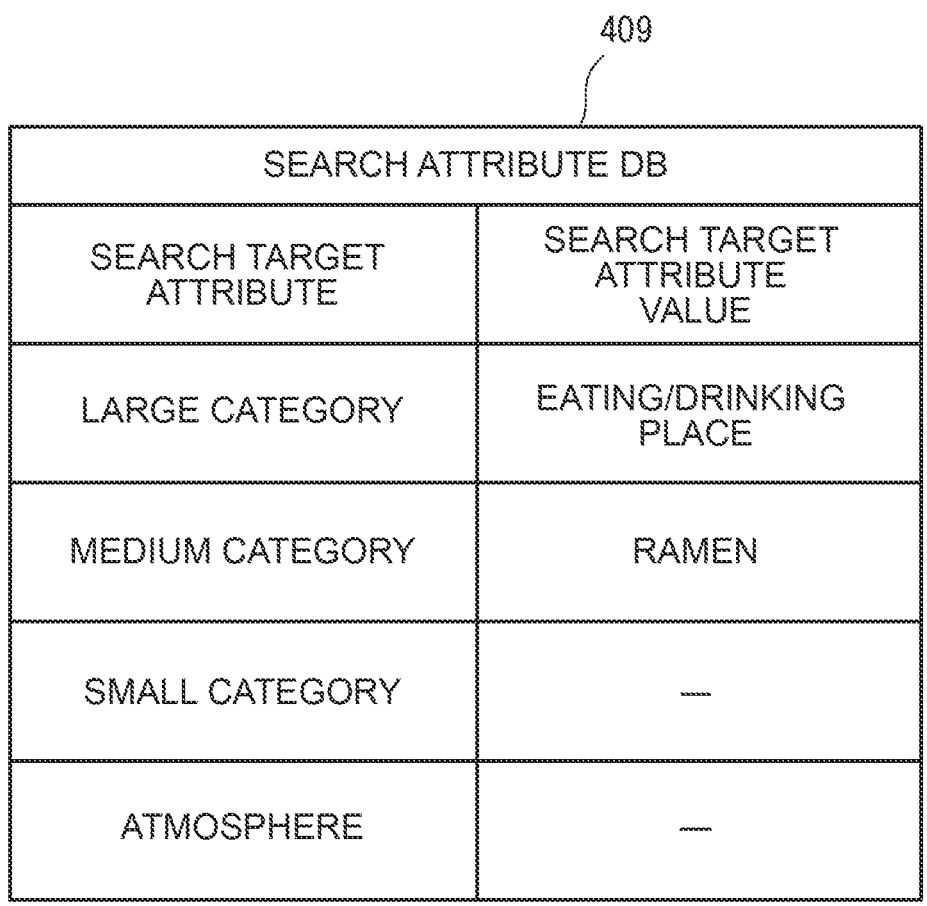
FIG. 8 is a diagram showing an example of a search attribute DB.

FIG. 8 is a diagram explaining an example of the data and data structure of the search attribute DB 409, and is specifically an example of the search attribute DB 409 to be used in the service of "shop search".

As shown in FIG. 8, the data stored in the search attribute DB 409 is configured from a search target attribute, and a search target attribute value.

The search target attribute is an item attribute included in the search condition, and is an item attribute of the item DB 407.

The search target attribute value is an item attribute value included in the search condition, and is an attribute value in the search condition relative to the attribute of the search target attribute. For example, when the search target attribute is "medium category", the value in the search condition relative to the medium category is stored as the search target attribute value, and, in the example of FIG. 7, this value may be "ramen", "restaurant" or "fast food". If there is no search condition, "–" is stored.

The example of FIG. 8 shows that the search will be conducted under the search condition of (item attribute "large category"=eating/drinking place AND item attribute "medium category"=ramen).

Attribute Value Score DB

The data and data structure of the attribute value score DB 411 generated by the attribute value score computing unit 410 are now explained.

FIG. 9 is a diagram explaining an example of the data and data structure of the attribute value score DB 411, and is specifically an example of the attribute value score used in the service of "shop search".

As shown in FIG. 9, the attribute value score DB 411 is configured from a search target attribute, a search target attribute value, and a user-based attribute value score.

The search target attribute is an item attribute included in the search condition, and is one of the item attributes of the item DB 407.

The search target attribute value is an item attribute value in the search condition; that is, the attribute value that may be taken relative to the attribute of the search target attribute. For example, when the search target attribute is "medium category", the value in the search condition relative to the medium category is stored as the search target attribute value, and, in the example of FIG. 7, this value may be "ramen", "restaurant" or "fast food".

Flowchart

Figure 10:
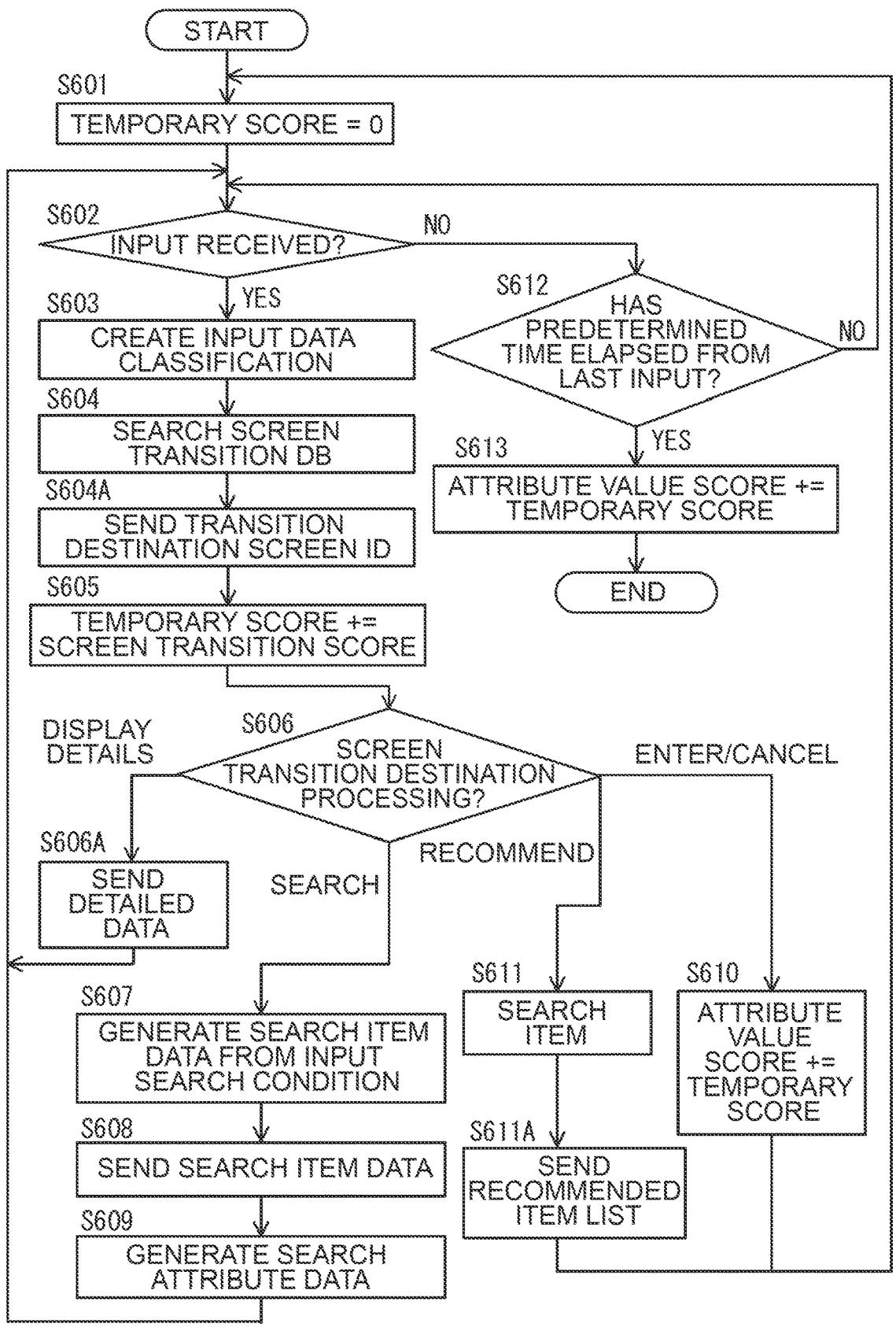
FIG. 10 is a flowchart showing an operation of a program for updating an attribute value score.

FIG. 10 shows an example of a flowchart representing the operation of the program for updating the attribute value score. As described above, because the attribute value score DB 411 stores the attribute value score for each user ID, the program to be executed based on the operation of the flowchart shown in FIG. 10 is also executed separately for each user ID. In other words, the attribute value score and the temporary score described later are not affected by the input from the portable terminal 104 having a different user ID.

The information processing device 101 is constantly waiting to receive an input from the portable terminal 104, and, upon receiving an input from the portable terminal 104, activates the program to be executed based on the operation shown in FIG. 10.

However, if the program has already been activated, the program is not newly activated. In the ensuing explanation, the execution agent of each step is the central processing unit 202. The central processing unit 202 stores the user ID to be processed by the program that is being executed, and activates separate programs for each user ID.

In step S601, the central processing unit 202 resets the temporary score, which temporarily stores the accumulation of the screen transition scores, to zero, and then proceeds to step S602.

In step S602, the central processing unit 202 determines whether there is a new input from the portable terminal 104. The central processing unit 202 proceeds to step S603 upon determining that there is a new input, and proceeds to step S612 upon determining that there is no new input.

In step S603, the central processing unit 202 causes the input acquisition unit 404 to acquire the input data and current screen ID received from the portable terminal 104 via the request/response transmission/reception unit 401 and the request/response processing unit 402. The central processing unit 202 causes the input acquisition unit 404 to generate an input data classification by using the input data of the portable terminal 104, and then proceeds to step S604.

In step S604, the central processing unit 202 causes the screen transition processing unit 406 to refer to the screen transition DB 405. The screen transition processing unit 406 searches the screen transition DB 405 and extracts the record in which the transition source screen ID coincides with the current screen ID acquired by the input acquisition unit 404, and in which the input data classification coincides with the input data classification generated in step S603. The transition destination screen ID, the screen transition destination processing, and the screen transition score are determined based on this extraction processing. In other words, the screen transition score is calculated based on this step. The central processing unit 202 then proceeds to step S604A.

In step S604A, the central processing unit 202 sends the transition destination screen ID of the record searched in step S604 to the portable terminal 104 via the request/response processing unit 402 and the request/response transmission/reception unit 401. In the portable terminal 104 that received the transition destination screen ID, the transition destination screen is generated by the request/response processing unit 503, and displayed on the display unit 504. However, when additional information such as the search item data 412 is required from the information processing device 101, the transition destination screen is not yet displayed on the display unit 504. The central processing unit 202 then proceeds to step S605.

In step S605, the central processing unit 202 adds the screen transition score of the record searched in step S604 to the temporary score, and then proceeds to step S606. In step S606, the central processing unit 202 determines whether the screen transition destination processing of the record searched in step S604 is (1) "Search", (2) "enter" or "cancel", (3) "Details", or (4) "recommendation". The central processing unit 202 proceeds to step S607 upon determining that the screen transition destination processing is "Search", and proceeds to step S610 upon determining that the screen transition destination processing is "enter" or "cancel". The central processing unit 202 proceeds to step S606A upon determining that the screen transition destination processing is "Details", and proceeds to step S611 upon determining that the screen transition destination processing is "recommendation".

In step S606A that is executed when the screen transition destination processing is "Details", the central processing unit 202 acquires information related to the item in which detailed information is being requested by the item DB 407, and sends the acquired information to the portable terminal 104. The central processing unit 202 then returns to step S602.

In step S607 that is executed when the screen transition destination processing is "Search", the central processing unit 202 causes the item search unit 408 to read the item DB 407. The item search unit 408 extracts the item data which coincides with the search condition from the item DB 407 based on the search condition acquired by the input acquisition unit 404, and generates the search item data 412. The central processing unit 202 then proceeds to step S608.

In step S608, the central processing unit 202 sends the search item data 412 generated by the item search unit 408 in step S607 to the portable terminal 104 via the request/response processing unit 402 and the request/response transmission/reception unit 401. In the portable terminal 104 that received the search item data 412, the search item data 412 is displayed on the display unit 504 by the request/response processing unit 503. The user of the portable terminal 104 views the display unit 504 displaying the display screen after the screen transition, and then performs additional input operations.

The central processing unit 202 then proceeds to step S609.

In step S609, the central processing unit 202 causes the item search unit 408 to generate a record configured from the search target attribute and the search target attribute value to be recorded in the search attribute DB 409. The search attribute DB 409 is used in step S610. The central processing unit 202 then returns to step S602.

In step S610 that is executed when the screen transition destination processing is "enter" or "cancel", the central processing unit 202 causes the attribute value score computing unit 410 to read the search attribute DB 409 generated in step S609, and the user ID to be processed by the corresponding program. The attribute value score computing unit 410 adds the temporary scores accumulated in step S605 with regard to all attribute values recorded in the search attribute DB 409. In other words, the attribute value score computing unit 410 reads the search attribute DB 409, and adds the temporary score to the attribute value score of the user ID to be processed in the records of the attribute value score DB 411 in which the search target attribute and the search target attribute value coincide. The central processing unit 202 outputs the destination to the route guide application 420 and starts the route guide when the screen transition destination processing is "enter". The central processing unit 202 then returns to step S601.

In step S611 that is executed when the screen transition destination processing is "recommendation", the central processing unit 202 causes the recommended item information generation unit 413 to generate the recommended item list 414. The recommended item information generation unit 413 searches the attribute value score DB 411, and extracts the attribute with the highest attribute value score. Next, the recommended item information generation unit 413 searches the item DB 407, extracts the items having the extracted attribute, and stores the extracted items as the recommended item list 414. The central processing unit 202 then proceeds to step S611A.

In step S611A, the central processing unit 202 sends the recommended item list 414 generated in step S611 to the portable terminal 104, and then returns to step S601.

In step S612 that is executed when it is determined that there is no new input from the portable terminal 104, the central processing unit 202 determines whether a predetermined time or longer, for instance, 1 hour or longer, has elapsed from the last input. The central processing unit 202 proceeds to step S613 upon determining that a predetermined time or longer has elapsed from the last input, and returns to step S602 upon determining that a predetermined time or longer has not elapsed from the last input.

In step S613, as with step S610, the central processing unit 202 causes the attribute value score computing unit 410 to read the search attribute DB 409 generated in step S609, and the user ID to be processed by the corresponding program. The attribute value score computing unit 410 adds the temporary scores accumulated in step S605 with regard to all attribute values recorded in the search attribute DB 409. The central processing unit 202 thereafter ends the program that is executed based on the operation shown in FIG. 10. The lapse of a predetermined time or longer from the last input is deemed to be equivalent to the user's "cancel" operation, and, because it is anticipated that there will be no input from the user for a while, the program is ended in order to conserve resources.

Operation Example

An operation of the information processing system 1 is now explained with reference to FIG. 11.

Figure 11:
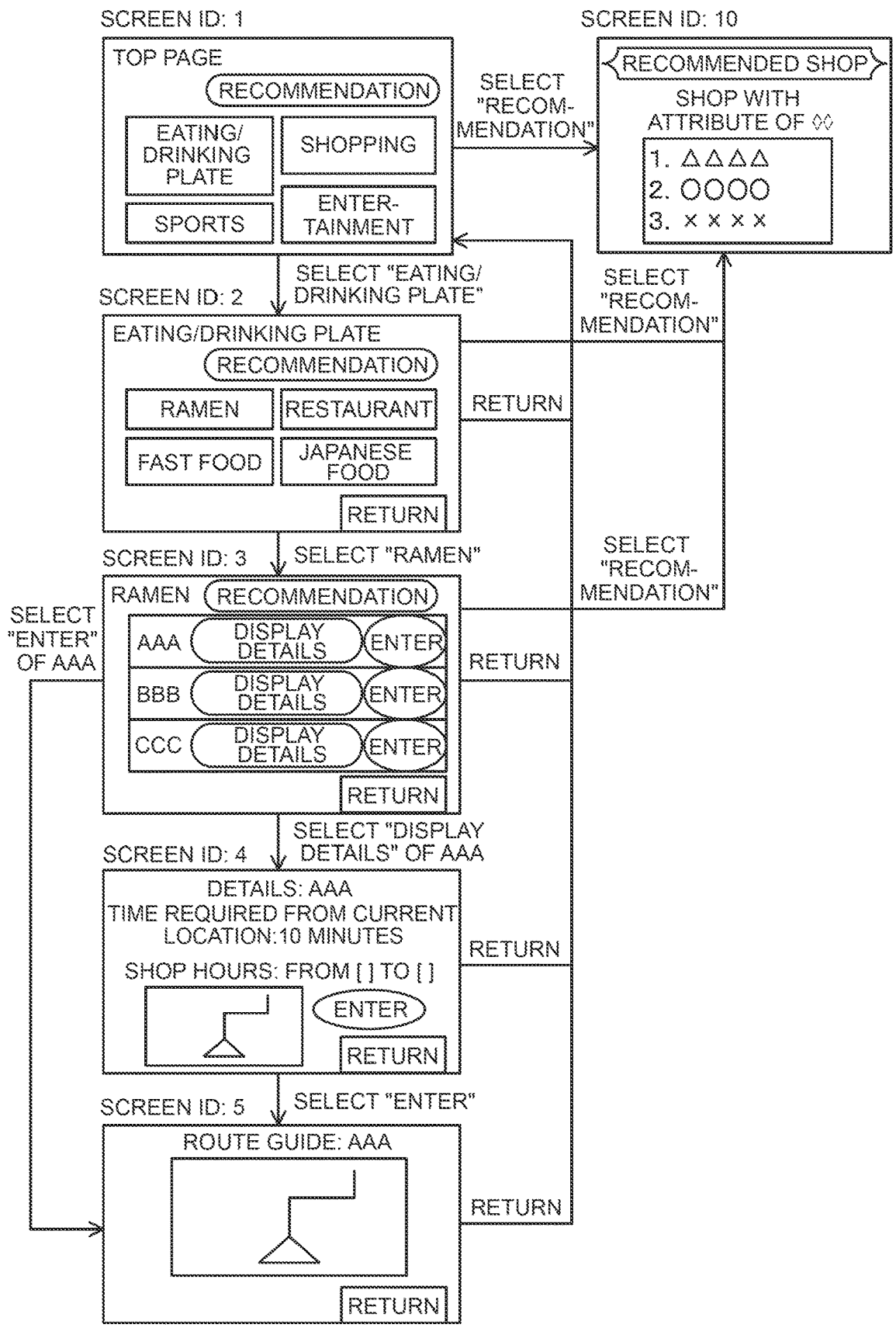
FIG. 11 is a diagram showing an operation example of an information processing system.

FIG. 11 is a diagram showing the transition of the screen to be displayed on the display device 305 by the display unit 504 of the portable terminal 104. The screen ID of each screen shown in FIG. 11 corresponds to the screen ID in the screen transition DB 405 shown in FIG. 6. At the time that the screen ID is "1", let it be assumed that the attribute value score DB 411 is as shown in FIG. 9. Moreover, let it also be assumed that the user ID of the portable terminal 104 is "UID 1234".

The screen having the screen ID of "1" displays the four search buttons of "eating/drinking place", "shopping", "sports", and "entertainment", and a "recommendation" button for obtaining recommended items. All screens other than the screen having the screen ID of "1" are provided with a "return" button, and, when this button is pressed, the user can return to the screen having the screen ID of "1" from any other screen.

In the ensuing explanation, the example of the screen ID making a transition in order from 1 to 5 is foremost described, and other examples are thereafter explained.

Operation Example: Case of Reaching Screen ID 5

When the user operates the input unit 501 and selects "eating/drinking place" while the screen having the screen ID of "1" is being displayed on the display device 305 of the portable terminal 104, the screen ID "1" and its input are sent to the information processing device 101. The input acquisition unit 404 of the information processing device 101 determines that the input from the portable terminal 104 is "search condition/search instruction" (FIG. 10, step S603).

The screen transition processing unit 406 refers to the screen transition DB 405, and extracts a record in which the transition source screen ID is "1" and the input data classification is "search condition/search instruction" (FIG. 10, step S604).

In the extracted record, the transition destination screen ID is "2", the screen transition destination processing is "Search", and the screen transition score is "10". The central processing unit 202 sends the transition destination screen ID "2" to the portable terminal 104 (FIG. 10, step S604A). The central processing unit 202 adds the screen transition score "10" to the current temporary score "0" (FIG. 10, step S605). The item search unit 408 searches the item DB 407 based on the keyword of "eating/drinking place", and generates the search item data 412 including the items of {ramen, restaurant, fast food, Japanese food} (FIG. 10, step S607).

The central processing unit 202 sends the search item data 412 to the portable terminal 104 (FIG. 10, step S608). When the request/response processing unit 503 of the portable terminal 104 receives the transition destination screen ID "2" and the search item data 412, the request/response processing unit 503 displays the screen having the screen ID of "2" shown in FIG. 11.

The item search unit 408 stores the record in which the search target attribute is "large category" and the search target attribute value is "eating/drinking place" in the search attribute DB 409, and stands by for an input from the portable terminal 104 (FIG. 10, step S609→step S602).

In the ensuing explanation, the details are omitted and the differences are mainly described.

When the user operates the input unit 501 and selects "ramen" while the screen having the screen ID of "2" is being displayed on the display device 305, the screen ID "2" and its input are sent to the information processing device 101. The input acquisition unit 404 of the information processing device 101 determines that the input from the portable terminal 104 is "search condition/search instruction". The screen transition processing unit 406 refers to the screen transition DB 405 and extracts a record in which the transition source screen ID is "2" and the input data classification is "search condition/search instruction". Because the screen transition score of this record is "10", the central processing unit 202 adds the screen transition score "10" to the current temporary score "10". In other words, the temporary score becomes "20". The item search unit 408 stores the record in which the search target attribute is "medium category" and the search target attribute value is "ramen" in the search attribute DB 409.

When the user operates the input unit 501 and selects "Display details" of AAA while the screen having the screen ID of "3" is being displayed on the display device 305, the screen ID "3" and its input are sent to the information processing device 101. The input acquisition unit 404 of the information processing device 101 determines that the input from the portable terminal 104 is "detail display instruction". The screen transition processing unit 406 refers to the screen transition DB 405, and extracts a record in which the transition source screen ID is "3" and the input data classification is "detail display instruction". Because the screen transition score of this record is "20", the central processing unit 202 adds the screen transition score "20" to the current temporary score "20". In other words, the temporary score becomes "40". The central processing unit 202 acquires detailed information related to AAA from the item DB 407, and sends the acquired information to the portable terminal 104 (FIG. 10, step S606A).

When the user operates the input unit 501 and selects "enter" while the screen having the screen ID of "4" is being displayed on the display device 305, the screen ID "4" and its input are sent to the information processing device 101. The input acquisition unit 404 of the information processing device 101 determines that the input from the portable terminal 104 is "route guide". The screen transition processing unit 406 refers to the screen transition DB 405, and extracts a record in which the transition source screen ID is "4" and the input data classification is "route guide". Because the screen transition score of this record is "50", the central processing unit 202 adds the screen transition score "50" to the current temporary score "40". In other words, the temporary score becomes "90".

The attribute value score computing unit 410 adds the temporary score of "90" to the attribute value score in which the search target attribute of the attribute value score DB 411 is "large category" and the search target attribute value is "eating/drinking place", and to the attribute value score in which the search target attribute of the attribute value score DB 411 is "medium category" and the search target attribute value is "ramen" (FIG. 10, step S610). In other words, in the example of FIG. 9, because the user ID is "UID 1234", the attribute value score in which the search target attribute is "large category" and the search target attribute value is "eating/drinking place" is updated from "70" to "160", and the attribute value score in which the search target attribute is "medium category" and the search target attribute value is "ramen" is updated from "40" to "130".

The central processing unit 202 outputs the destination to the route guide application 420, and starts the route guide. The screen having the screen ID of "5" is displayed on the display unit 504 of the portable terminal 104, and the route guide is thereby started.

Operation Example: Case of Not Reaching Screen ID 5

The operation in cases where, in the foregoing operation example, the user operates the input unit 501 and selects "return" while the screen having the screen ID of any one of "2" to "4" is being displayed on the display device 305 is now explained.

When the user operates the input unit 501 and selects "return" while the screen having the screen ID of "2" is being displayed on the display device 305, the screen ID "2" and its input are sent to the information processing device 101. The input acquisition unit 404 of the information processing device 101 determines that the input from the portable terminal 104 is "cancellation instruction". The screen transition processing unit 406 refers to the screen transition DB 405, and extracts a record in which the transition source screen ID is "2" and the input data classification is "cancellation instruction". Because the screen transition score of this record is "0", the temporary score remains at "10".

The attribute value score computing unit 410 adds the temporary score of "10" to the attribute value score in which the search target attribute of the attribute value score DB 411 is "large category" and the search target attribute value is "eating/drinking place". In other words, in the example of FIG. 9, because the user ID is "UID 1234", the attribute value score in which the search target attribute of the attribute value score DB 411 is "large category" and the search target attribute value is "eating/drinking place" is updated from "70" to "80".

When the user operates the input unit 501 and selects "return" while the screen having the screen ID of "3" is being displayed on the display device 305, the operation will be as follows. Because the temporary score is "20", in the example of FIG. 9, the attribute value score in which the search target attribute of the attribute value score DB 411 is "large category" and the search target attribute value is "eating/drinking place" is updated from "70" to "90", and the attribute value score in which the search target attribute is "medium category" and the search target attribute value is "ramen" is updated from "40" to "60".

When the user operates the input unit 501 and selects "return" while the screen having the screen ID of "4" is being displayed on the display device 305, the operation will be as follows. Because the temporary score is "40", in the example of FIG. 9, the attribute value score in which the search target attribute of the attribute value score DB 411 is "large category" and the search target attribute value is "eating/drinking place" is updated from "70" to "110", and the attribute value score in which the search target attribute is "medium category" and the search target attribute value is "ramen" is updated from "40" to "80".

Operation Example: Display of Recommended Item

The operation in cases where, in the foregoing operation example, the user operates the input unit 501 and selects "recommendation" while the screen having the screen ID of any one of "1" to "3" is being displayed on the display device 305 is now explained. However, because the same operation is performed in these screen IDs, only the case where the screen ID is "1" will be explained.

When the user operates the input unit 501 and selects "recommendation" while the screen having the screen ID of "1" is being displayed on the display device 305, the screen ID "1" and its input are sent to the information processing device 101. The input acquisition unit 404 of the information processing device 101 determines that the input from the input acquisition unit 404 is "recommendation display instruction". The screen transition processing unit 406 refers to the screen transition DB 405, and extracts a record in which the transition source screen ID is "1" and the input data classification is "recommendation display instruction".

In the extracted record, the transition destination screen ID is "10", the screen transition destination processing is "recommendation", and the screen transition score is "0". The central processing unit 202 sends the transition destination screen ID "10" to the portable terminal 104 (FIG. 10, step S604A). Because the screen transition score is "0", the central processing unit 202 maintains "0" as the current temporary score (FIG. 10, step S605).

The central processing unit 202 causes the recommended item information generation unit 413 to generate the recommended item list 414. The recommended item information generation unit 413 refers to the attribute value score DB 411, and extracts "amusement" with the highest attribute value score. The recommended item information generation unit 413 searches the item DB 407 for items in which the search target attribute value is "amusement", and stores the searched items as the recommended item list 414. The recommended item information generation unit 413 sends "amusement" as the search condition and the generated recommended item list 414 to the portable terminal 104.

The portable terminal 104 displays the received recommended item list 414 on the display unit 504, and additionally displays "amusement" as the search condition together with the reason that such items are recommended.

The following effects can be yielded according to the embodiment described above.

(1) An information processing system 1 includes an information processing device 101, and a portable terminal 104 which communicates with the information processing device 101. The information processing system 1 includes an input unit 501 which receives an input of a user, a display unit 504 which displays a screen, a screen transition processing unit 406 which decides a screen to be subsequently displayed by the display unit 504 and causes the display unit 504 to perform a screen transition based on the input of the input unit 501 and the display of the display unit 504, a screen transition score calculation unit (step S604 of FIG. 10) which calculates a screen transition score each time the screen transition processing unit 406 causes the display unit 504 to perform a screen transition, an item DB 407 which associates and stores an item name and an item attribute, an attribute value score DB 411 which associates and stores the item attribute and an attribute score indicating the user's preference with regard to the item attribute, an item search unit 408 which searches the item DB 407 based on the user's input, and extracts at least the item attribute, and a score addition unit (step S610 of FIG. 10) which adds the screen transition score calculated by the screen transition score calculation unit (step S604 of FIG. 10) to the attribute score associated with the item attribute extracted by the item search unit 408.

Because the information processing system 1 is configured as described above, the attribute value score indicating the user's preference is calculated each time a screen transition is performed, and, therefore, the user's preference information can be generated even when the process is terminated midway without the item being ultimately determined.

(2) The information processing system 1 further includes a recommended item information generation unit 413 which extracts an attribute from the attribute value score DB 411 with the highest attribute value score, and extracts the item name associated with the extracted attribute from the item DB 407.

Thus, it is possible to extract items that better match the user's preference and actions and make recommendations by using the attribute values that are calculated based on screen transitions, including cases where the user cancels the process midway without selecting an item.

(3) The display unit 504 displays a plurality of screens including an initial screen having the screen ID of 1. Each time the screen transition score calculation unit (step S604 of FIG. 10) calculates the screen transition score, the score addition unit (step S610 of FIG. 10) integrates the calculated screen transition score as a temporary score (step S605 of FIG. 10), and adds the temporary score to the attribute value score when the screen transition processing unit 406 decides to make a transition to the initial screen having the screen ID of 1 (step S610 of FIG. 10).

Thus, even when the user does not make a final decision, the attribute value score is updated as a result of returning to the initial screen having the screen ID of 1, and information related to the user's preference can thereby be accumulated.

Modified Example 1

While the recommended item information generation unit 413 searched for an attribute with the highest attribute value score among all attributes, the search method is not limited thereto. The item attribute to be used as the search target may be limited based on the user's specific designation, or the item attribute to be used as the search target may also be limited based on the user's last selection.

For example, based on the user's specific designation, only items in which the item attribute value of the item attribute "atmosphere" is "quiet" may be used as the search target. When the user presses "recommendation" after selecting "eating/drinking place" as shown in the operation example of the foregoing embodiment, only items in which the item attribute value is "eating/drinking place" may be used as the search target.

Modified Example 2

The bibliographic items and attributes to be recorded in the item DB 407 are not limited to those described in the foregoing embodiment. A feature that is common among a plurality of shops may be set as a new attribute, or a previously recorded attribute may be segmentalized. In other words, an attribute may be segmentalized to the full extent, and different attributes may be assigned to each of the shops.

Modified Example 3

Any one of the functions and any one of the databases equipped in the information processing device 101 may also be equipped in another server connected via a network. In other words, functions that are equivalent to those of the information processing device 101 in the foregoing embodiment may also be realized by a plurality of servers performing coordinated operation. In particular, the item DB 407 may be separated into item attributes and other information, and stored by being distributed in a plurality of servers.

According to Modified Example 3, the information processing device 101 can be configured from various servers, and the backup configuration and scale-out can be facilitated.

Modified Example 4

Any one of the functions and any one of the databases equipped in the information processing device 101 may also be equipped in portable terminal 104. In other words, functions that are equivalent to those of the information processing device 101 in the foregoing embodiment may also be realized by the information processing device 101 and the portable terminal 104 performing coordinated operation. In particular, the attribute values of the attribute value score DB 411, which are information unique to the user, may be stored in the portable terminal 104.

According to Modified Example 4, the configuration of the information processing device 101 can be simplified, and the load of the information processing device 101 can be reduced. When the attribute values of the attribute value score DB 411 are to be stored in the portable terminal 104, because information unique to the user, which is frequently overwritten, can be deleted from the information processing device 101, the load of the information processing device 101 can be reduced.

Modified Example 5

In the foregoing embodiment, only the screen transition score stored in advance in the screen transition DB 405 was added to the temporary score. Nevertheless, the temporary score may also be increased or decreased in accordance with the user's reaction associated with the screen transition.

In other words, after performing a screen transition of the screen to be displayed on the display unit 504, the portable terminal 104 may record the user's speech for a predetermined time, and send the recorded speech to the information processing device 101. The information processing device 101 may analyze the received speech information to determine whether the speech was a positive remark or a negative remark, and increase or decrease the temporary score accordingly.

The additional processing to be performed in the information processing device 101 in the case of increase or decreasing the temporary score according to the user's reaction is now explained with reference to a flowchart.

Figure 12:
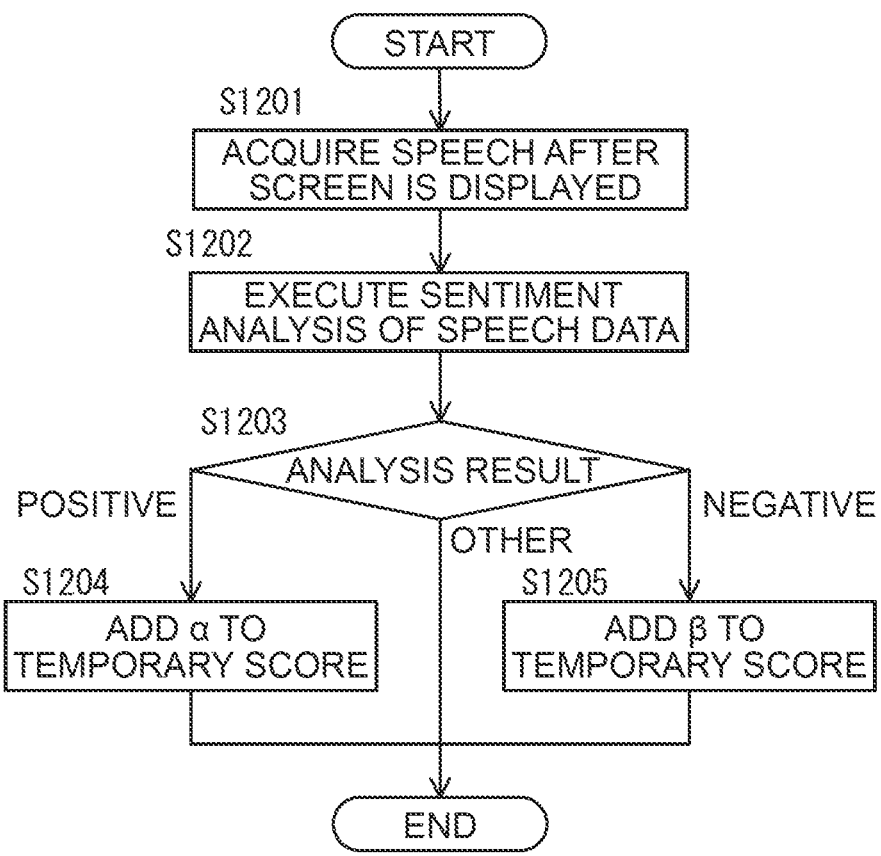
FIG. 12 is a flowchart explaining an increase or a decrease of a temporary score in Modified Example 5.

FIG. 12 is a program to be executed in parallel with the program to be executed based on the operation of FIG. 10 explained in the foregoing embodiment.

In step S1201, the central processing unit 202 acquires, via the request/response transmission/reception unit 401 and the request/response processing unit 402, the speech data input to the portable terminal 104 after the screen transition. The central processing unit 202 then proceeds to step S1202.

In step S1202, the central processing unit 202 executes the so-called positive/negative analysis, or sentiment analysis, of analyzing whether the acquired speech data is positive or negative. While various methods are known for performing the positive/negative analysis, for instance, the speech data is converted into text, and analysis is performed by using a dictionary of positive words and a dictionary of negative words and determining how many of these words are included in the speech data. The central processing unit 202 then proceeds to step S1203.

In step S1203, the central processing unit 202 determines whether the result of the sentiment analysis performed in step S1202 corresponds to positive, negative, or neither positive nor negative. The central processing unit 202 proceeds to step S1204 upon determining that the result of the sentiment analysis is positive, proceeds to step S1205 upon determining that the sentiment analysis is negative, and ends the program executed based on the operation of FIG. 12 upon determining that the sentiment analysis is neither positive nor negative.

In step S1204, the central processing unit 202 adds α to the temporary score. α may be a predetermined constant, or a numerical value based on the strength of emotion analyzed in step S1202. The central processing unit 202 thereafter ends the program executed based on the operation of FIG. 12.

In step S1205, the central processing unit 202 subtracts β from the temporary score. β may be a predetermined constant, or a numerical value based on the strength of emotion analyzed in step S1202. The central processing unit 202 thereafter ends the program executed based on the operation of FIG. 12.

According to Modified Example 5, it is possible to reflect the user's emotion during one's operation based on the input data, and extract the characteristics of the user's preference and actions in greater detail.

Modified Example 6

In the foregoing embodiment, the temporary score was added to the attribute value of the attribute value score DB 411 irrespective of whether the user's final decision is "enter" or "cancel". Nevertheless, the case where the final decision is "enter" and the case where the final decision is "cancel" may be differentiated, and recorded as different attribute values.

FIG. 13 is a diagram showing the attribute value score DB 411 in Modified Example 6. In the foregoing embodiment, the attribute value score DB 411 included one attribute value for each item for each user ID. In Modified Example 6, the attribute value score DB 411 includes two attribute values for each item for each user ID; specifically, an attribute value based on a positive determination (hereinafter referred to as the "positive attribute value") and an attribute value based on a negative determination (hereinafter referred to as the "negative attribute value").

The processing in step S610 of FIG. 10 is changed as follows. In other words, when the screen transition destination processing is "enter", the central processing unit 202 may add the temporary score to the positive attribute value in the corresponding item attribute of the attribute value score DB 411. When the screen transition destination processing is "cancel", the central processing unit 202 may add the temporary score to the negative attribute value in the corresponding item attribute of the attribute value score DB 411.

Figure 14:
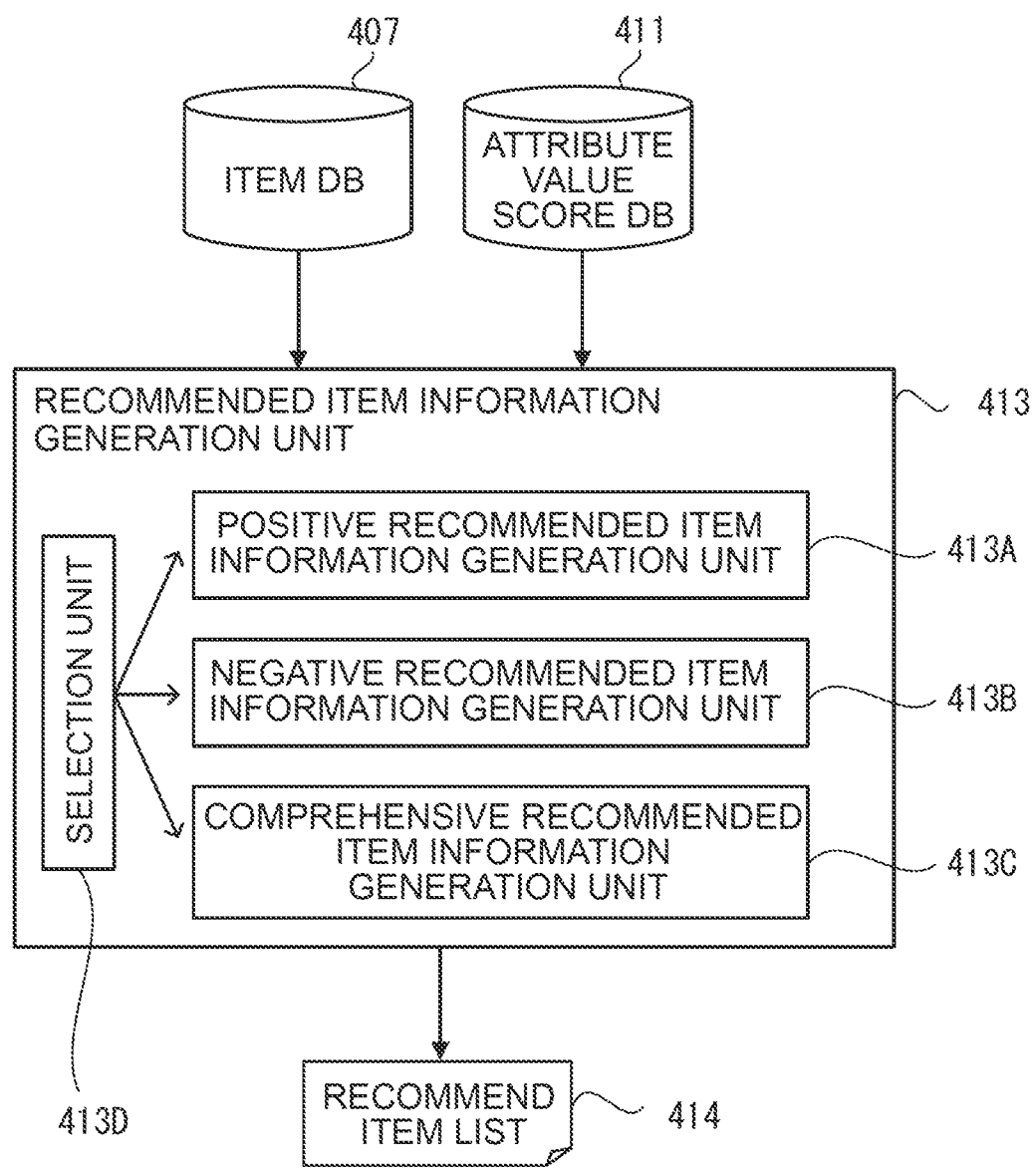
FIG. 14 is a schematic diagram showing a configuration of a recommended item information generation unit in Modified Example 6.

Furthermore, the recommended item information generation unit 413 may further comprise, as shown in FIG. 14, a positive recommended item information generation unit 413A, a negative recommended item information generation unit 413B, a comprehensively recommended item information generation unit 413C, and a selection unit 413D. FIG. 14 is a schematic diagram showing the configuration of the recommended item information generation unit 413 in Modified Example 6.

The positive recommended item information generation unit 413A focuses on the positive attribute value of the user ID to be processed which is stored in the attribute value score DB 411. The positive recommended item information generation unit 413A searches the attribute value score DB 411 and extracts an item attribute with the greatest positive attribute value. Next, the positive recommended item information generation unit 413A searches the item DB 407 and extracts items including the extracted item attribute, and stores the extracted items as the recommended item list 414.

The negative recommended item information generation unit 413B focuses on the negative attribute value of the user ID to be processed which is stored in the attribute value score DB 411. The negative recommended item information generation unit 413B searches the attribute value score DB 411 and extracts an item attribute with the greatest negative attribute value. Next, the negative recommended item information generation unit 413B searches the item DB 407 and extracts items including the extracted item attribute, and stores the extracted items as the recommended item list 414.

The comprehensively recommended item information generation unit 413C focuses on the positive attribute value and the negative attribute value of the user ID to be processed which is stored in the attribute value score DB 411. The comprehensively recommended item information generation unit 413C searches the attribute value score DB 411 and extracts an item attribute in which the sum of the positive attribute value and the negative attribute value is greatest. Next, the comprehensively recommended item information generation unit 413C searches the item DB 407 and extracts items including the extracted item attribute, and stores the extracted items as the recommended item list 414. In other words, the comprehensively recommended item information generation unit 413C corresponds to the recommended item information generation unit 413 in the foregoing embodiment.

When the recommended item information generation unit 413 receives an operation instruction from the central processing unit 202, the selection unit 413D selects which unit among the positive recommended item information generation unit 413A, the negative recommended item information generation unit 413B, and the comprehensively recommended item information generation unit 413C should be activated. The selection unit 413D may also select multiple units.

The following effects can be yielded according to Modified Example 6.

(1) The recommended item information generation unit 413 includes a positive recommended item information generation unit 413A which extracts an attribute with the greatest positive attribute value, and extracts the item name associated with the extracted attribute from the item DB 407, and a negative recommended item information generation unit 413B which extracts an attribute with the greatest negative attribute value, and extracts the item name associated with the extracted attribute from the item DB 407.

Thus, by using the positive attribute values, it is possible to provide the user with information of items that are likely to match the user's preference. Moreover, by using the negative attribute values, while certain items may not match the user's preference, it is possible to provide the user with information of a variety of items.

(2) The recommended item information generation unit 413 further includes a selection unit 413D which selects whether to use the positive recommended item information generation unit 413A or the negative recommended item information generation unit 413B.

Thus, because both positive attribute values and negative attribute values are stored, it is possible to easily switch between the two upon creating the recommended item list 414.

Furthermore, the following operation may be performed when the number of items of the recommended item list 414, which was created based on the positive recommended item information generation unit 413A or the negative recommended item information generation unit 413B selected by the selection unit 413D, is fewer than a predetermined number. In other words, a recommended item list 414 based on the other unit which was not selected by the selection unit 413D may additionally be created, and the recommended item lists 414 created by both units may be combined and sent to the portable terminal 104.

Modified Example 7

In the foregoing embodiment, while the screen transition score was set relative to the combination of the screen ID of the transition source and the screen ID after the transition, the method of setting the screen transition score is not limited thereto.

The screen transition score may also be set by focusing only on the screen ID after the transition. In other words, in the foregoing embodiment, while a different screen transition score could be set in the case where the screen ID makes a transition from 4 to 1 and in the case where the screen ID makes a transition from 3 to 1, the screen transition score may be the same irrespective of the screen ID of the transition source so as long as the screen ID after the transition is the same.

A screen transition score may be set for three or more screen transitions. In other words, a screen transition score in the case where the transition of the screen ID is in the order of 1, 2, 3 may be set, or a screen transition score in the case where the transition of the screen ID is in the order of 1, 2, 4 may be set.

According to Modified Example 7, a detailed screen transition score can be set for the screen transition, and the user's preference can be reflected in the attribute value score with greater detail.

Modified Example 8

In the foregoing embodiment, there was only one attribute value score DB 411.

Nevertheless, a plurality of attribute value score DBs 411 may be provided, and the attribute value score DB 411 in which the attribute value is to be updated may be changed according to the status, or the attribute value score DB 411 to be referred to by the recommended item information generation unit 413 may be changed.

In other words, a plurality of attribute value score DBs 411 may be prepared and used for different purposes, for instance, in accordance with the weather, time period, month of activity, and number of persons accompanying the user. This is because the user's preference is considered to be different depending on the conditions.

For example, three attribute value score DBs 411 are prepared by dividing the time period into the three categories of morning, evening and night. The attribute value score computing unit 410 selects the attribute value score DB in which the attribute value is to be updated according to the time period of performing the processing. The recommended item information generation unit 413 selects the attribute value score DB 411 to be referred to according to the time period of performing the processing.

According to Modified Example 8, it is possible to generate a recommended item list 414 reflecting the user's preference according to the status.

Modified Example 9

In the foregoing embodiment, while the portable terminal 104 was a PDA, it may also be a mobile phone or a car navigation terminal. Furthermore, while the information processing system 1 was configured by the information processing device 101 and the portable terminal 104 performing coordinated operation, the information processing system may also be configured based on a device which is integrally equipped with the functions of the information processing device 101 and the portable terminal 104 in the foregoing embodiment.

While the items to be processed in the foregoing embodiment were shops, the items are not limited to shops. Any item that can be individually identified and classified may be used as the item to be processed.

A modified example of using a video program as the item based on a device which is integrally equipped with the functions of the information processing device 101 and the portable terminal 104 in the foregoing embodiment is now explained with reference to FIG. 15 and FIG. 16.

While the overall configuration of the system is considerably different from the foregoing embodiment, the details of the functions are the same. The same reference numeral is given to the same component as the foregoing embodiment, and the differences are mainly explained. If no specific explanation is provided for a certain component, then that component is the same as the component explained in the foregoing embodiment.

Figure 15:
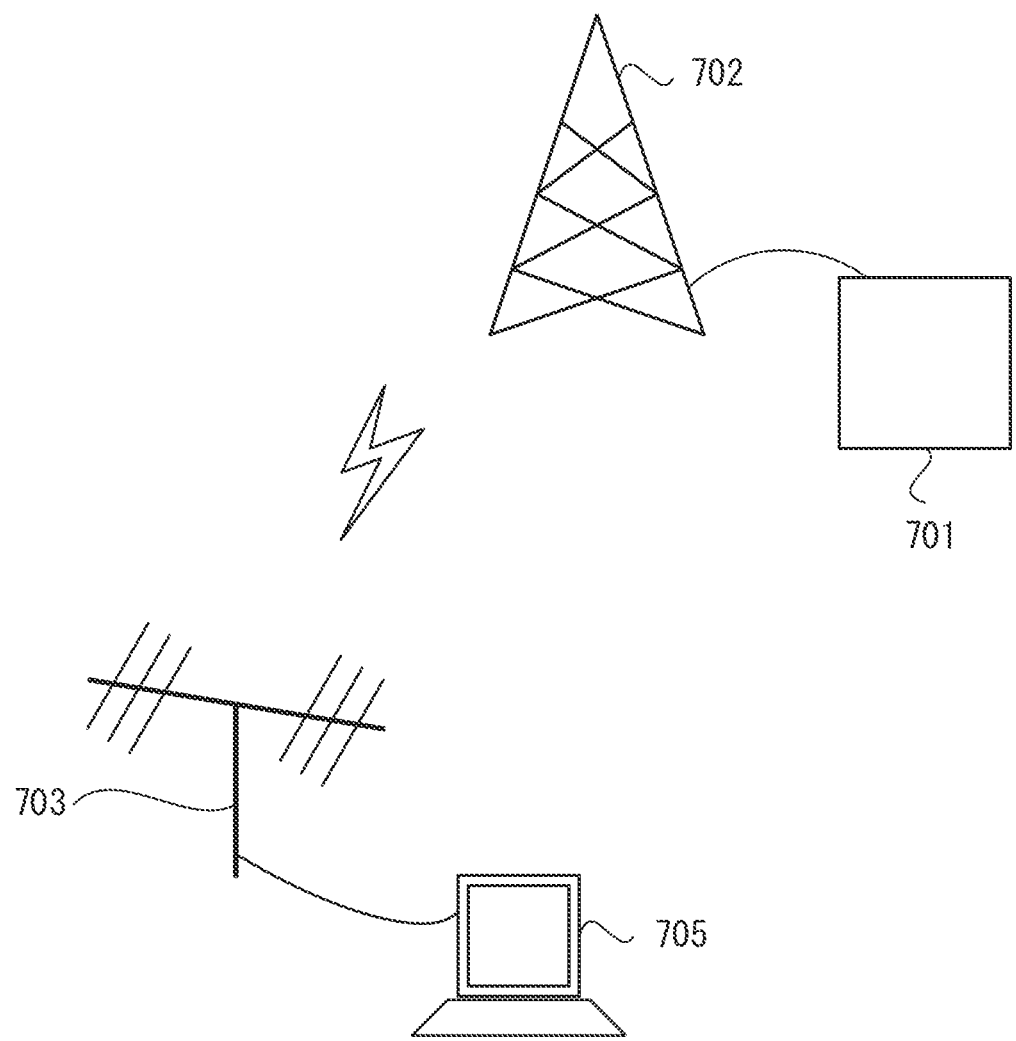
FIG. 15 is a system configuration diagram in Modified Example 9.

FIG. 15 is a system configuration diagram in the case of using the information processing device to recommend video programs.

The system includes a program broadcast server 701 which distributes video programs and a program broadcast guide (hereinafter referred to as the "program guide"), a radio tower 702 which sends the video programs and the program guide as radio waves, an antenna 703 which receives the radio waves, and a TV 705 which records and plays the video programs.

The program guide distributed by the program broadcast server 701 includes the distribution time of the video programs, channels on which the video programs will be broadcast, detailed information of the programs, and attributes of the programs. An attribute of a program is, for instance, "education", "news", "music", or "movies", and each attribute is additionally segmentalized based on the target age.

The user of the TV 705 operates the TV 705 by using an input device such as a remote controller. The TV 705 displays, on the display unit of the TV, for instance, a program search screen, a program guide list screen, a detail display screen of each program, and a recording selection screen.

The user causes the display unit of the TV 705 to display the program guide, and views the detailed information of a program or sets the video recording timer for recording a video program. The TV 705 not only stores the attributes of the video program for which the user set the video recording timer, but also stores the attributes of the video program for which the user only viewed the detailed information, as attributes that represent the user's preference.

Figure 16:
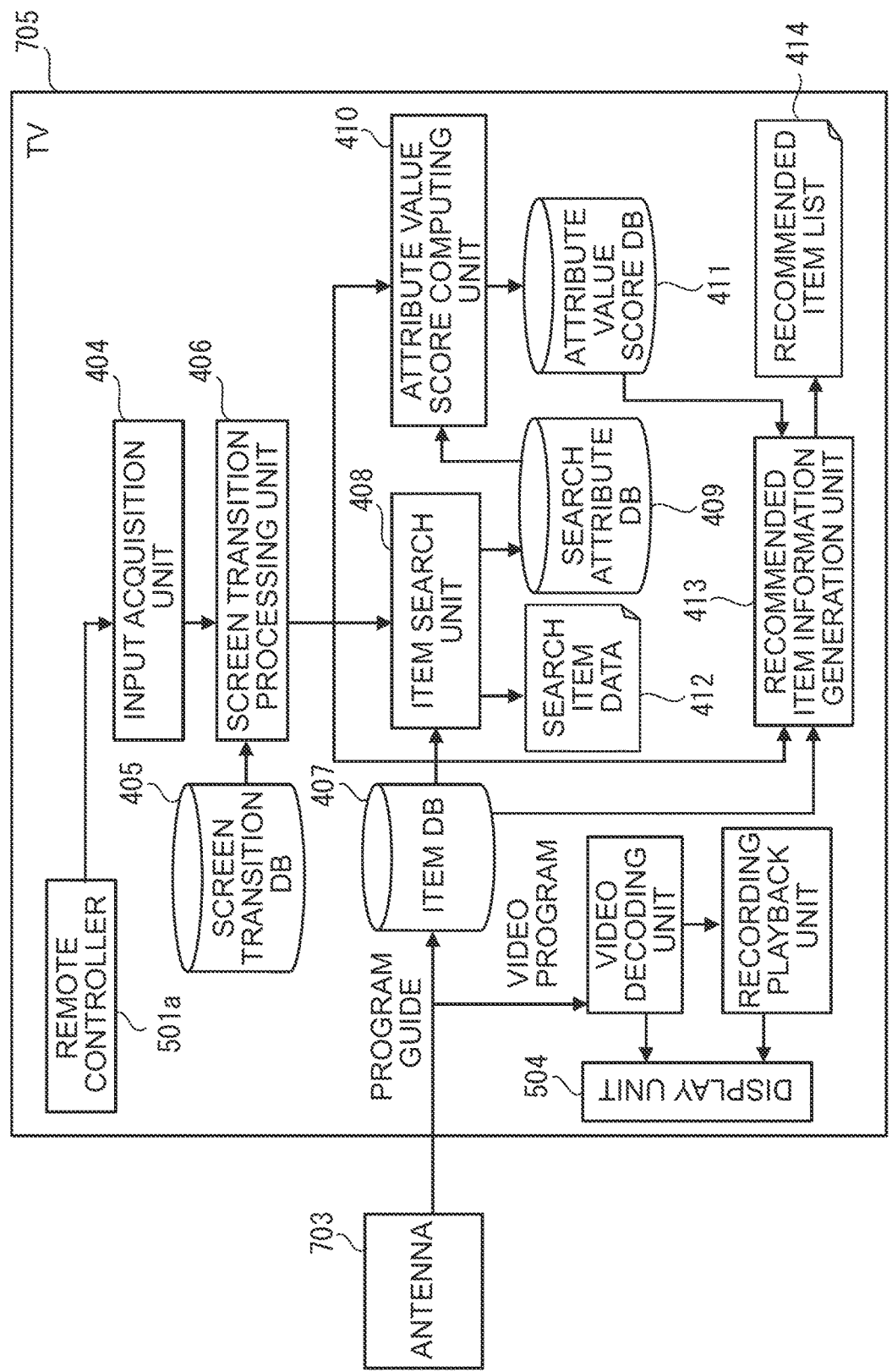
FIG. 16 is a functional block diagram of a TV in Modified Example 9.

FIG. 16 is a diagram showing, as functional blocks, the functions of the software programs to be executed by the TV 705. In other words, the TV 705 is configured in the same manner as the information processing device 101 in the foregoing embodiment in its function of accumulating the user's preference information and extracting the recommended items. Furthermore, the TV 705 additionally includes a video decoding unit and a recording playback unit for recording and playing video programs. Information related to the video programs and the program guide are superimposed on the radio waves received by the antenna 703. The item DB 407 is updated based on the program guide received from the antenna 703. The video program output by the video decoding unit may be directly output to the display unit 504, or recorded with the recording playback unit.

The following effects can be yielded by the TV 705 according to Modified Example 9. The TV 705 includes an input unit 501a which receives an input of a user, a display unit 504 which displays a screen, a screen transition processing unit 406 which decides a screen to be subsequently displayed by the display unit and causes the display unit to perform a screen transition based on the input of the input unit 501a and the display of the display unit 504, and a screen transition score calculation unit (step S604 of FIG. 10) which calculates a screen transition score each time the screen transition processing unit 406 causes the display unit 504 to perform a screen transition. The TV 705 additionally includes an item DB 407 which associates and stores an item name and an item attribute, an attribute value score DB 411 which associates and stores the item attribute and an attribute score indicating the user's preference with regard to the item attribute, an item search unit 408 which searches the item DB 407 based on the user's input, and extracts at least the item attribute, and a score addition unit (step S610 of FIG. 10) which adds the screen transition score calculated by the screen transition score calculation unit (step S604 of FIG. 10) to the attribute score associated with the item attribute extracted by the item search unit 408.

Thus, TV 705 can generate the user's preference information and recommend items based on such preference information without having to communicate with other devices.

Furthermore, the recorder in this modified example may be a personal computer, or a recorder that is not equipped with a display unit.

Each of the foregoing embodiments and modified examples may also be respectively combined.

While various embodiments and modified examples were explained above, the present invention is not limited to the subject matter thereof. Other modes considered to fall within the technical scope of the present invention are also covered by the scope of the present invention.

The disclosure of the following priority application is incorporated herein by reference.

Japanese Patent Application No. 2015-21162 (filed on Feb. 5, 2015)

REFERENCE SIGNS LIST

1 . . . Information processing system
101 . . . Information processing device
104 . . . Portable terminal
202 . . . Central processing unit
406 . . . Screen transition processing unit
408 . . . Item search unit
409 . . . Search attribute DB
410 . . . Attribute value score computing unit
412 . . . Search item data
413 . . . Recommended item information generation unit
413A . . . Positive recommended item information generation unit
413B . . . Negative recommended item information generation unit
413D . . . Selection unit
414 . . . Recommended item list
501 . . . Input unit

The invention claimed is:

1. An information processing device comprising:
a communication interface that is communicatively coupled to a mobile computer via a network;
a memory that stores:
an item database which associates and stores an item name and an item attribute;
a screen transition database which stores information related to screen transition; and
an attribute score database which associates and stores the item attribute and an attribute score indicating preferences of a user with regard to the item attribute;
a processor that is communicatively coupled to the communication interface and the memory, wherein the processor is configured to:
receive, using the communication interface, a first input from the mobile computer, wherein the first input is received in response to the mobile computer displaying a first screen;
select, using the memory, a second screen by searching the screen transition database based on the first input;
control, using the communication interface, the mobile computer to display the second screen, wherein the second screen prompts the user to enter a second input;
receive, using the communication interface, the second input from the mobile computer, wherein the second input is associated with a particular user of the mobile computer;
extract a particular item attribute by searching the item database based on the second input received a request received from the mobile computer;
determine a positive attribute score and a negative attribute score for the particular item attribute by searching the attribute score database based on the particular user of the mobile computer;
transmit, using the communication interface, a recommendation list to the mobile computer based on the positive attribute score and the negative attribute score for the particular item;
receive, using the communication interface, a third input from the mobile computer, wherein the third input is received in response to the mobile computer displaying a third screen that contains the recommendation list;
selectively add a screen transition score to the positive attribute score to form a positive temporary score when the third input indicates that the user selected an item from the recommendation list;
selectively add the screen transition score to the negative attribute score to form a negative temporary score when the third input indicates that the user is requesting to return to the second screen; and
update values of the positive attribute score and the negative attribute score stored in the attribute score database with the positive temporary score and the negative temporary score respectively.

2. The information processing device according to claim 1,
wherein the screen transition score is further calculated based on a speech or video information acquired by the mobile computer.

3. An information processing system, comprising:
a mobile computer that receives inputs from a user and displays screens to the user;

an item database which associates and stores an item name and an item attribute;
a screen transition database which stores information related to screen transition; and
an attribute score database which associates and stores the item attribute and an attribute score indicating preferences of a user with regard to the item attribute;
an information processing server that comprises a processor and is communicatively coupled to the mobile computer, the item database, the screen transition database and the attribute score database;
wherein the processor of the information processing server is configured to:
 receive, using a communication interface, a first input from the mobile computer, wherein the first input is received in response to the mobile computer displaying a first screen;
 select a second screen by searching the screen transition database based on the first input;
 control, using the communication interface, the mobile computer to display the second screen, wherein the second screen prompts the user to enter a second input;
 receive, using the communication interface, the second input from the mobile computer, wherein the second input is associated with a particular user of the mobile computer;
 extract a particular item attribute by searching the item database based on the second input received from the mobile computer; and
 determine a positive attribute score and a negative attribute score for the particular item attribute by searching the attribute score database based on the particular user of the mobile computer;
 transmit, using the communication interface, a recommendation list to the mobile computer based on the positive attribute score and the negative attribute score for the particular item;
 receive, using the communication interface, a third input from the mobile computer, wherein the third input is received in response to the mobile computer displaying a third screen that contains the recommendation list;
 selectively add a screen transition score to the positive attribute score to form a positive temporary score when the third input indicates that the user selected an item from the recommendation list;
 selectively add the screen transition score to the negative attribute score to form a negative temporary score when the third input indicates that the user is requesting to return to the second screen; and
 update values of the positive attribute score and the negative attribute score stored in the attribute score database with the positive temporary score and the negative temporary score respectively.

4. The information processing system according to claim 3,
wherein the screen transition score is further calculated based on a speech or video information acquired by the mobile computer.

* * * * *